(12) United States Patent
Lee et al.

(10) Patent No.: US 8,244,049 B2
(45) Date of Patent: Aug. 14, 2012

(54) METHOD, MEDIUM AND APPARATUS EFFECTIVELY COMPRESSING AND RESTORING EDGE POSITION IMAGES

(75) Inventors: Sang-jo Lee, Suwon-si (KR); Si-hwa Lee, Seoul (KR); Do-hyung Kim, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1255 days.

(21) Appl. No.: 12/007,266

(22) Filed: Jan. 8, 2008

(65) Prior Publication Data

US 2008/0175498 A1    Jul. 24, 2008

(30) Foreign Application Priority Data

Jan. 19, 2007   (KR) .................... 10-2007-0006308

(51) Int. Cl.
  *G06K 9/36* (2006.01)
  *H04N 7/32* (2006.01)
(52) U.S. Cl. ............. 382/238; 382/233; 348/409.1; 375/240.12
(58) Field of Classification Search .......... 382/238, 382/233; 348/394.1, 409.1, 415.1, 412.1; 375/240.12
See application file for complete search history.

(56) References Cited

U.S. PATENT DOCUMENTS

| 5,260,782 | A * | 11/1993 | Hui ..................... 375/240.15 |
| 5,524,067 | A * | 6/1996 | Miyake et al. ............ 382/234 |
| 2004/0062445 | A1* | 4/2004 | Kim et al. ............... 382/238 |
| 2004/0081240 | A1 | 4/2004 | Chen et al. |
| 2007/0002945 | A1 | 1/2007 | Kim |

FOREIGN PATENT DOCUMENTS

| EP | 0615384 A3 | 3/1994 |
| EP | 0615384 A2 | 9/1994 |
| JP | 2005-123999 | 5/2005 |
| KR | 10-2001-0097053 | 11/2001 |
| KR | 10-2006-0109642 | 10/2006 |
| WO | WO02/07447 A1 | 1/2002 |

OTHER PUBLICATIONS

Elyousfi et al., "Fast Mode Decision Algorithm for Intra prediction in H.264/AVC Video Coding", IJCSMS International Journal of Computer Science and Network Security, vol. 7, No. 1, Jan. 2007 (in English).
Chinese Office Action for corresponding Chinese Patent Application No. 200810003705.3 dated Feb. 28, 2011 (9 pgs).
Feng Pan et al., "Fast Mode Decision Algorithm for Intraprediction in H.264/AVC Video Coding", IEEE Transactions on Circuits and Systems for Video Technology, vol. 15, No. 7, Jul. 1, 2005, pp. 813-822, XP011135306, 10 pgs (in English).
European Search Report for corresponding European Patent Application No. 08150217 dated Nov. 5, 2008, 9 pgs (in English).

* cited by examiner

*Primary Examiner* — Jon Chang
(74) *Attorney, Agent, or Firm* — Staas & Halsey LLP

(57) ABSTRACT

Provided are an apparatus and method for effectively compressing and restoring edge areas in an image. Therefore, by predicting values of pixels positioned at each directional edge, among pixels constructing a 2×2 block in a current image, using values of neighbor pixels of the pixels positioned at each directional edge, selecting an edge mode corresponding to a directional edge in which the difference between the predicted values and actual values of the pixels is a minimum, and outputting edge mode data indicating the edge mode instead of the predicted values corresponding to the edge mode, it is possible to effectively compress edge areas in which little similarity exists between pixel values, and accordingly improve a compression rate of edge areas.

16 Claims, 11 Drawing Sheets

FIG. 7

| N2 | N3 | N4 |
|----|----|----|
| N1 | P0 | P1 |
| N0 | P2 | P3 |

FIG. 8

| N2 | N3 | N4 |
|----|----|----|
| N1 | P0 | P1 |
| N0 | P2 | P3 |

FIG. 9

| N2 | N3 | N4 |
|----|----|----|
| N1 | P0 | P1 |
| N0 | P2 | P3 |

METHOD, MEDIUM AND APPARATUS EFFECTIVELY COMPRESSING AND RESTORING EDGE POSITION IMAGES

CROSS-REFERENCE TO RELATED APPLICATIONS

This application claims the benefit of Korean Patent Application No. 10-2007-0006308, filed on Jan. 19, 2007, in the Korean Intellectual Property Office, the disclosure of which is incorporated herein in its entirety by reference.

BACKGROUND

1. Field

One or more embodiments of the present invention relate to an apparatus, method and medium compressing and restoring images, and more particularly, to an apparatus, method and medium effectively compressing and restoring edge areas in an image.

2. Description of the Related Art

Existing image compression techniques, such as H.264, JPEG-LS, and the JPEG standards, utilize a basic principle of removing similarities between pixel values constructing an image. The basic principle can be applied to a variety of images, however it cannot be applied to parts of natural images or synthetic images in which little similarity exists between pixel values. In particular, an example of an image in which little similarity exists between pixel values is an edge area of an image. The edge refers to an area whose pixel values have significant differences with respect to values of neighboring pixels.

FIG. 1 illustrates a variety of areas in an image.

Referring to FIG. 1, area 0 demonstrates little change between values of adjacent pixels, while the remaining areas 1, 2, 3, and 4 are areas in which changes between values of adjacent pixels are significant. Areas 1 through 4 are representative edge areas. If existing image compression methods are applied to the edge areas, compression efficiency and picture quality of restored images deteriorate significantly because similarities between pixel values cannot be utilized.

SUMMARY

One or more embodiments of the present invention provide an apparatus and method effectively compressing and restoring edge areas.

One or more embodiments of the present invention also provide an apparatus and method effectively compressing and restoring a variety of images other than edge areas.

One or more embodiments of the present invention also provide a computer-readable recording medium having embodied thereon a program for executing methods that effectively compress and restore edge areas.

Additional aspects and/or advantages will be set forth in part in the description which follows and, in part, will be apparent from the description, or may be learned by practice of the invention.

According to an aspect of the present invention, there is provided a pixel value prediction method including: (a) determining pixels positioned at a predetermined directional edge, among pixels constructing a block having a predetermined size in a current image; (b) determining neighbor pixels positioned in each of two areas divided by the predetermined directional edge; and (c) predicting values of the pixels positioned at the predetermined directional edge, using values of the determined neighbor pixels.

According to another aspect of the present invention, there is provided a computer-readable recording medium having embodied thereon a program for executing the pixel value prediction method.

According to another aspect of the present invention, there is provided a first image compression method including: (a) predicting values of pixels positioned at a predetermined directional edge among pixels constructing a block having a predetermined size in a current image, using values of neighbor pixels of the pixels positioned at the predetermined directional edge; (b) repeating operation (a) with respect to each remaining directional edge except for the predetermined directional edge, among a plurality of directional edges; (c) selecting an edge mode in which the difference between the values predicted in operations (a) and (b) and actual values of the pixels positioned at the predetermined directional edge is a minimum; (d) outputting edge mode data indicating the selected edge mode, instead of the predicted values corresponding to the selected edge mode, thereby compressing the values of the pixels positioned at the predetermined directional edge.

According to another aspect of the present invention, there is provided a computer-readable recording medium having embodied thereon a program for executing the first image compression method.

According to another aspect of the present invention, there is provided a first image compression apparatus including: a first prediction unit predicting values of pixels positioned at a first directional edge, using values of neighbor pixels of the pixels positioned at the first directional edge, among pixels constructing a block having a predetermined size in a current image; a second prediction unit predicting values of pixels positioned at a second directional edge, using values of neighbor pixels of the pixels positioned at the second directional edge, among the pixels constructing the block having the predetermined size in the current image; a third prediction unit predicting values of pixels positioned at a third directional edge, using values of neighbor pixels of the pixels positioned at the third directional edge, among the pixels constructing the block having the predetermined size in the current image; a fourth prediction unit predicting values of pixels positioned at a fourth directional edge, using values of neighbor pixels of the pixels positioned at the fourth directional edge, among the pixels constructing the block having the predetermined size in the current image; an edge mode selecting unit selecting an edge mode corresponding to a directional edge in which the difference between the values of the pixels predicted by the first, second, third, and fourth prediction units and actual values of the pixels is a minimum; and a compression unit outputting edge mode data indicating the selected edge mode, instead of the predicted values corresponding to the selected edge mode, thereby compressing the values of the pixels.

According to another aspect of the present invention, there is provided a second image compression method including: (a) compressing values of pixels constructing a block having a predetermined size in a current image, according to a plurality of predetermined image compression methods; (b) predicting values of pixels positioned at a predetermined directional edge, among the pixels constructing the block, using values of neighbor pixels of the pixels positioned at the predetermined directional edge, thereby compressing the values of the pixels positioned at the predetermined directional edge; (c) selecting a mode from among a plurality of modes corresponding to the plurality of predetermined image compression methods and an image compression method used in operation (b), on the basis of the results compressed in operations (a) and (b); and (d) generating a bit stream packet including mode data indicating the selected mode and compressed data corresponding to the selected mode.

According to another aspect of the present invention, there is provided a computer-readable recording medium having embodied thereon a program for executing the second image compression method.

According to another aspect of the present invention, there is provided a second image compression apparatus including: a first compression unit compressing values of pixels constructing a block having a predetermined size in a current image, according to a plurality of image compression methods; a second compression unit predicting values of pixels positioned at a predetermined directional edge, among the pixels constructing the block, using values of neighbor pixels of the pixels positioned at the predetermined directional edge, thereby compressing the values of the pixels positioned at the predetermined directional edge; an edge mode selecting unit selecting a mode from among a plurality of modes corresponding to the predetermined image compression methods and an image compression method used by the second compression unit, on the basis of the results compressed by the first compression unit and the second compression unit; and a bit packing unit generating a bit stream packet including mode data indicating the selected mode and compressed data corresponding to the selected mode.

According to another aspect of the present invention, there is provided a first image restoring method including: (a) recognizing an edge mode among a plurality of edge modes; and (b) predicting values of pixels positioned at a predetermined directional edge corresponding to the recognized edge mode, among pixels constructing a block having a predetermined size in a current image, using values of neighbor pixels of the pixels positioned at the predetermined directional edge.

According to another aspect of the present invention, there is provided a computer-readable recording medium having embodied thereon a program for executing the first image restoring method.

According to another aspect of the present invention, there is provided a first image restoring apparatus including: a mode recognition unit recognizing an edge mode among a plurality of edge modes; and a prediction unit predicting values of pixels positioned at a predetermined directional edge corresponding to the recognized edge mode, among pixels constructing a block having a predetermined size in a current image, using values of neighbor pixels of the pixels positioned at the predetermined directional edge.

According to another aspect of the present invention, there is provided a second image restoring method including: (a) extracting mode data and compressed data of a block having a predetermined size in a current image, from a bit stream packet; (b) recognizing a mode corresponding to an image compression method of a plurality of image compression methods, from the mode data; and (c) predicting values of pixels positioned at a directional edge indicated by the recognized mode, among pixels constructing the block, using values of neighbor pixels of the pixels positioned at the directional edge, according to the recognized mode, thereby restoring the values of the pixels positioned at the directional edge.

According to another aspect of the present invention, there is provided a computer-readable recording medium having embodied thereon a program for executing the second image restoring method.

According to another aspect of the present invention, there is provided a second image restoring apparatus including: an extracting unit extracting mode data and compressed data of a block having a predetermined size in a current image, from a bit stream packet; a mode recognition unit recognizing a mode corresponding an image compression method of a plurality of image compression methods, from the mode data; and a prediction unit predicting values of pixels positioned at a directional edge indicated by the recognized mode, among pixels constructing the block, using values of neighbor pixels of the pixels positioned at the directional edge, according to the recognized mode, thereby restoring the values of the pixels positioned at the directional edge.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 explains a pixel value calculation method such as performed by a second edge prediction unit illustrated in FIG. 5;

FIG. 8 explains a pixel value calculation method such as performed by a third edge prediction unit illustrated in FIG. 5;

FIG. 9 explains a pixel value calculation method such as performed by a fourth edge prediction unit illustrated in FIG. 5;

DETAILED DESCRIPTION OF EMBODIMENTS

Figure 1:
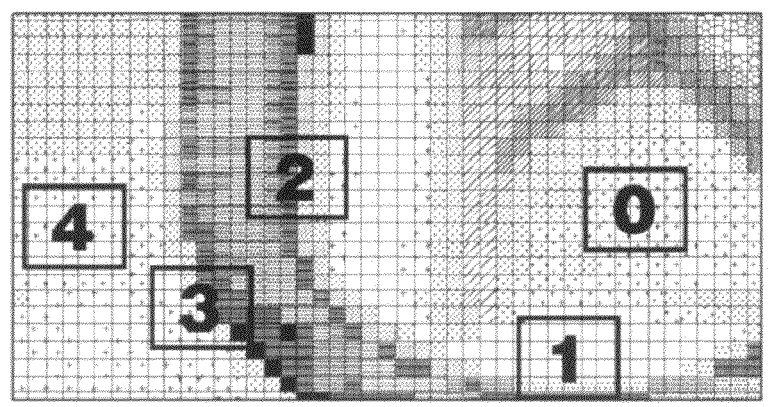
FIG. 1 illustrates a variety of areas in an image.

Reference will now be made in detail to embodiments, examples of which are illustrated in the accompanying drawings, wherein like reference numerals refer to the like elements throughout. Embodiments are described below to explain the present invention by referring to the figures. In particular, it may be understood by one of ordinary skill in the art that embodiments described below are applied to a RGB color space, but may also be applied to spaces other than the RGB color space, such as a YCbCr color space.

Figure 2:
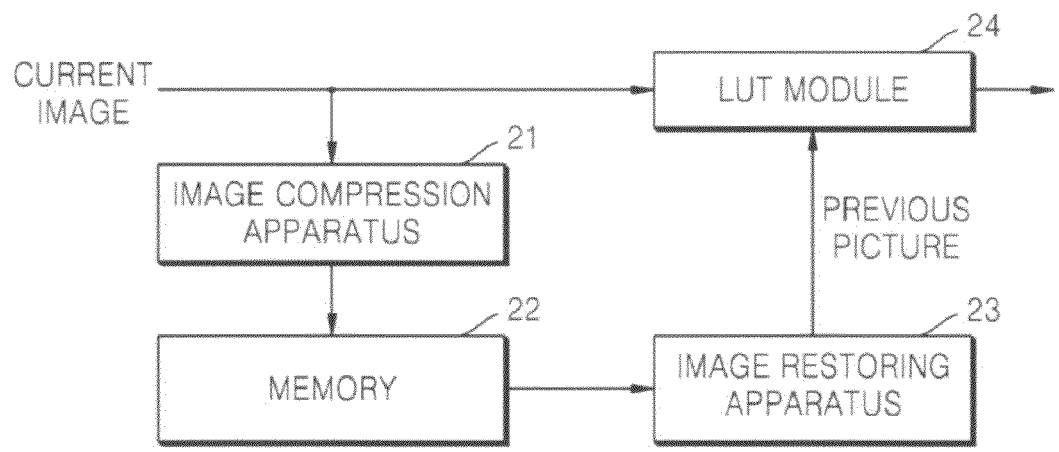
FIG. 2 is a block diagram of a Liquid Crystal Display Dynamic Capacitance Compensation (LCD DCC) apparatus, according to an embodiment of the present invention.

FIG. 2 illustrates a Liquid Crystal Display Dynamic Capacitance Compensation (LCD DCC) apparatus, according to an embodiment of the present invention.

Referring to FIG. 2, the LCD DCC apparatus may include, for example, an image compression apparatus 21, a memory 22, an image restoring apparatus 23, and a Lookup Table (LUT) module 24. The LCD DCC apparatus typically applies a voltage higher than a voltage required for driving pixels of a Thin Film Transistor (TFT)-LCD panel to the pixels, in order to improve a response time of the TFT-LCD panel.

The image compression apparatus 21 may compress a current image selectively using one of a variety of image compression methods such as a Differential Pulse Code Modulation (DPCM) method, a Pulse Code Modulation (PCM) method, a transformation method, or an edge method.

The memory 22 generally receives data compressed by the data compression apparatus 21, and stores the data therein. Accordingly, when a current image is received, compressed data corresponding to the previous image may be stored in the memory 22.

The image restoring apparatus 23 may restore previous images stored in the memory 22, selectively using one of a variety of image compression methods, such as the DPCM method, the transformation method, the PCM method, or the edge method.

The LUT module 24 may predict a voltage value required for achieving a target response time of the TFT-LCD panel, with reference to a lookup table stored therein. In more detail, the LUT module 24 may obtain voltage value information corresponding to a difference between the brightness value of a pixel of a current input image and the brightness value of the corresponding pixel of the previous image restored by the data restoring apparatus 23, from the lookup table, and may predict a voltage value required for achieving the target response time of the TFT-LCD panel, using the voltage value information and the target response time of the TFT-LCD panel.

As described above, in order to predict a voltage value required for achieving a target response time of a TFT-LCD panel, previous images usually have to be stored in the memory 22. However, the memory 22 has a fixed capacity. The image compression apparatus 21 and the image restoring apparatus 23, which will be described in greater detail below, may accurately obtain a picture-based Constant Bit Rate (CBR) required by a LCD DCC apparatus, while improving compression efficiency of edge areas and picture-quality of restored images.

Also, the image compression apparatus 21 and the image restoring apparatus 24 may be widely applied to a variety of image compression fields requiring low complexity and subjective lossless picture-quality, as well as to LCD DCC apparatuses as illustrated in FIG. 2. For example, the image compression apparatus 21 and the image restoring apparatus 24 may be applied to image compression for Display Driver ICs (DDIs), reference picture compression for video encoder/decoder systems, etc.

Figure 3:
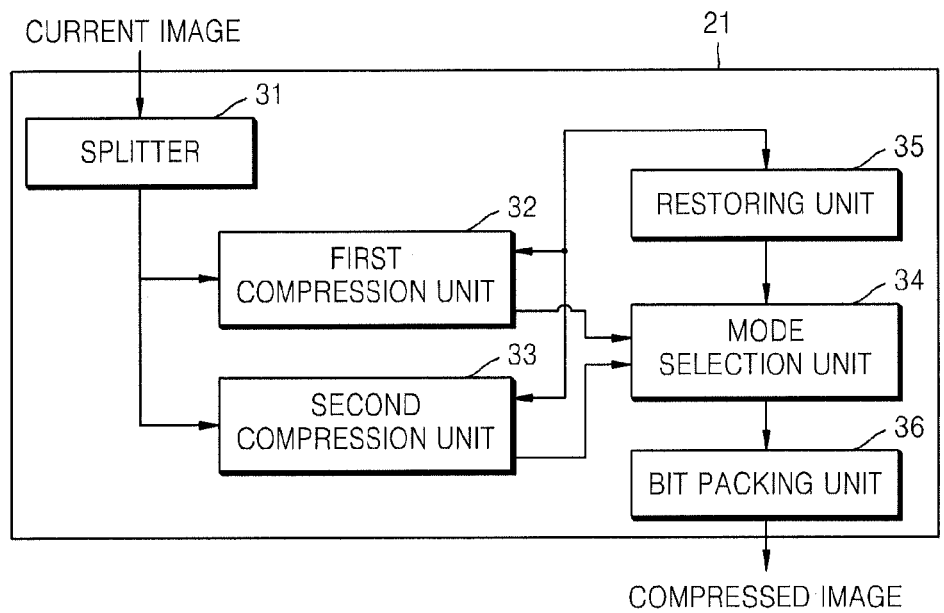
FIG. 3 illustrates an image compression apparatus illustrated in FIG. 2.

FIG. 3 illustrates the image compression apparatus 21 such as illustrated in FIG. 2.

Referring to FIG. 3, the image compression apparatus 21 may include, for example, a splitter 31, a first compression unit 32, a second compression unit 33, a mode selection unit 34, a restoring unit 35, and a bit packing unit 36. The image compression apparatus 21 may further include additional components such as a device for performing entropy-encoding to further improve an image compression rate, other than, or in addition to, the above-mentioned components.

The splitter 31 generally receives an image (hereinafter, referred to as a "current image"), divides the current image into a plurality of 2×2 blocks, each 2×2 block consisting of a set of four pixels, and outputs each 2×2 block to the first compression unit 32 and the second compression unit 33. Here, the current image may be referred to using different terms such as a current picture, a current frame, etc.

In an embodiment, the 2×2 block consists of four pixel values for each color component of the current image. Since a pixel value corresponding to a color component is 8 bits, the number of pixels included in a 2×2 block is 4, and color components of an image are R, G, and B components, the 2×2 block corresponds to 96 bits (=8×4×3). Specifically, each 2×2 block output to the first compression unit 32 and the second compression unit 33 may be referred to as a "current block.".

The first compression unit 32 may compress the four pixel values constructing the current block divided by the splitter 31, according to any of the DPCM method, the PCM method, and the transformation method, for example. In more detail, the first compression unit 32 may shift the four pixel values constructing the current block and four pixel values constructing a reference block corresponding to the current block, by the number of bits corresponding to each mode in a direction to the right, for each of a plurality of modes based on the DPCM method. The first compression unit 32 may predict differences between the shifted four pixel values of the current block and the shifted pixel values of the reference block, thereby compressing the four pixel values constructing the current block. Also, the first compression unit 32 may truncate a part of the four pixel values constructing the current block, thereby compressing the four pixel values constructing the current block, according to the PCM method. Also, the first compression unit 32 may compress the four pixel values constructing the current block using DCT transformation, etc., according to the transformation method. In general, the reference block may be the previous block of the current block; however, it may equally be a different neighboring block of the current block.

The DPCM and PCM methods are described in detail in Korean Patent Applications Nos. 2006-0056071 and 2006-0068896, and the transformation method is described in detail in the existing Joint Photographic Experts Group (JPEG) standard. In an embodiment, the term "PCM method" is used to represent a technical concept that is opposite to the above-described DPCM method, and may be different from a general PCM method of converting analog signals into digital signals. Specifically, the PCM method can be referred to using a different term, such as a truncation compression method, etc. The edge method is first proposed in one or more embodiments of the present invention, and will be described in more detail below.

The second compression unit 33 may predict values of two pixels located at each directional edge among the four pixels constructing the current block divided by the splitter 31 using values of neighboring pixels of the two pixels located at each directional edge, for each of four directional edges, and may truncate a part of the remaining pixel values which are not predicted, thereby compressing the four pixel values constructing the current block. In the current embodiment, the neighboring pixels may include at least two or more pixels among the four pixels constructing the current block and pixels constructing a neighboring block of the current block.

Figure 4:
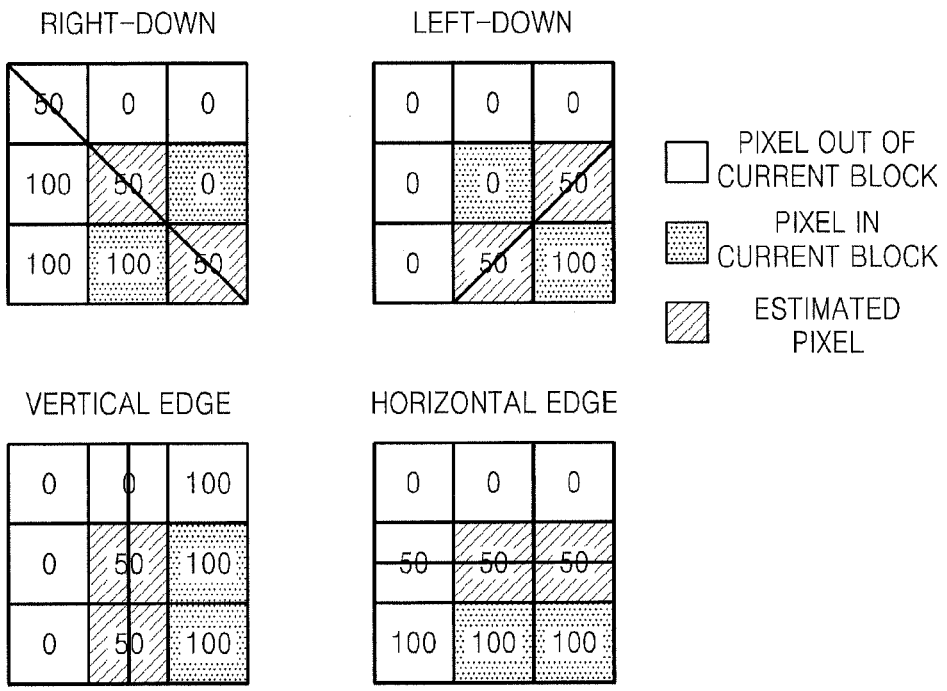
FIG. 4 illustrates four directional edges such as those used by a second compression unit illustrated in FIG. 3.

FIG. 4 illustrates four directional edges used by the second compression unit 33 illustrated in FIG. 3.

Referring to FIG. 4, in an embodiment, four directional edges, e.g., lower-right, lower-left, vertical, and horizontal directional edges, may be used. As illustrated in FIG. 4, at each directional edge, pixel value prediction may be performed on two pixels indicated with hatching. White pixels and pixels denoted by dots are neighboring pixels of two pixels that are positioned at each directional edge. Specifically, the white pixels are pixels disposed outside a current block, and the dotted pixels are pixels inside the current block. In an embodiment, by transferring only values of the white pixels to the image restoring apparatus 23 without transferring values of the pixels indicated with hatching in the current block to the image restoring apparatus 23, values of the pixels constructing the current block may be compressed.

Figure 5:
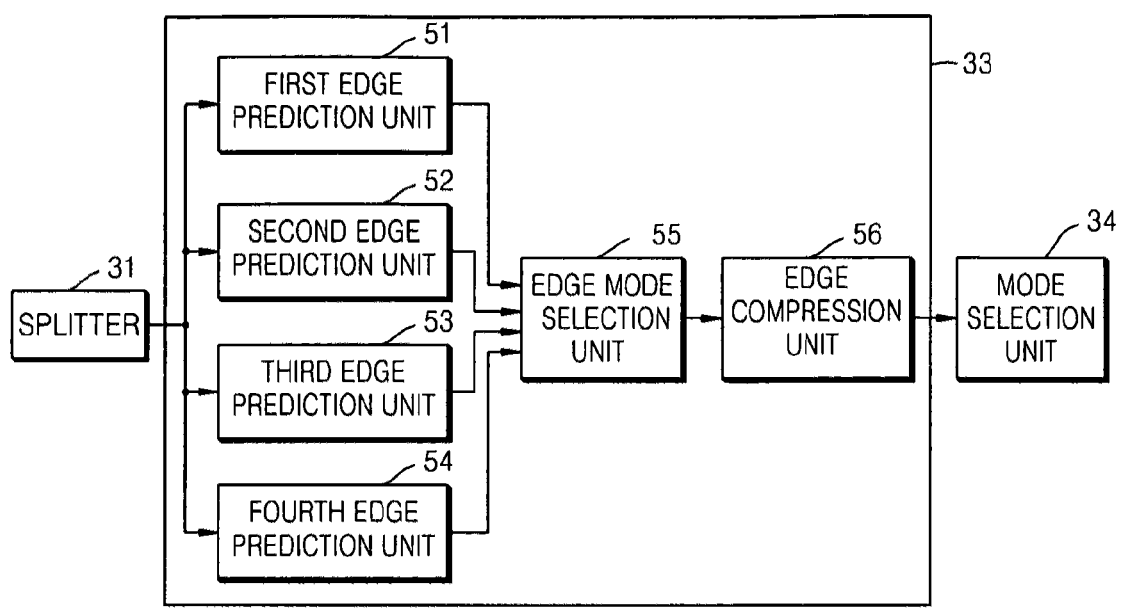
FIG. 5 illustrates the second compression unit such as illustrated in FIG. 3.

FIG. 5 illustrates the second compression unit 33 such as illustrated in FIG. 3.

Referring to FIG. 5, the second compression unit 33 may include, for example, a first edge prediction unit 51, a second edge prediction unit 52, a third edge prediction unit 53, a fourth edge prediction unit 54, an edge mode selection unit 55, and an edge compression unit 56.

The first edge prediction unit 51 may predict values of two pixels positioned at a lower-right directional edge among the four pixels constructing the current block divided by the splitter 31, using values of neighboring pixels of the two pixels positioned at the lower-right directional edge. In more detail, the first edge prediction unit 51 may predict values of two pixels positioned at a lower-right directional edge among the four pixels constructing the current block, using an average value of values of neighboring pixels of one of two areas divided by the lower-right directional edge and of values of neighboring pixels of the other of the two areas.

Figure 6:
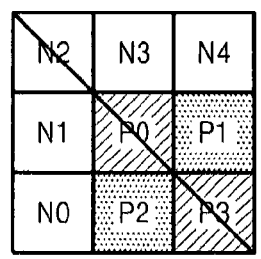
FIG. 6 explains a pixel value calculation method such as performed by a first edge prediction unit illustrated in FIG. 5.

FIG. 6 explains a pixel value calculation method such as performed by the first edge prediction unit 51 illustrated in FIG. 5.

Referring to FIG. 6, the first edge prediction unit 51 may predict a value of a current pixel P0, which is the upper pixel of two pixels P0 and P3 positioned at a lower-right directional edge, using an average value of values of the pixel P1 to the right of, a pixel P2 below, a pixel N1 to the left of, and a pixel N3 above the current pixel P0, each of which are neighboring pixels of the current pixel P0, according to Equation 1 below for example, for each color component of a current image.

$$P0=(P1+P2+N1+N3+2)/4 \qquad \text{Equation 1}$$

In Equation 1, the value "2" added to the value "P1+P2+N1+N3" may be used to correct the average value of "P1+P2+N1+N3" in order to improve the picture-quality of a restored image, and accordingly, the value "2" may be replaced by a different value or may be omitted. This may be applied in the same way to one or more of the following embodiments.

Also, the first edge prediction unit 51 may predict a value of the current pixel P0, which is the upper pixel of the two pixels P0 and P3 positioned at the lower-right directional edge, by summing a value of the pixel N2 to the upper-left of the current pixel P0, and a gradient value of the pixel P3 to the lower-right of the current pixel P0 with respect to the current pixel P0, according to Equation 2 below for example, for each color component of the current image. Also, the first edge prediction unit 51 may select a neighbor mode corresponding to neighboring pixels used to obtain a predicted value of the current pixel P0 having a smaller difference from the actual value of the current pixel P0 among the predicted values of the current pixel P0, from among two neighbor modes (corresponding to Equations 1 and 2) in which two patterns of neighboring pixels are respectively used, as described above, and may output neighbor mode data corresponding to the selected neighbor mode.

$$P0=N2+\text{delta1}, \text{delta1}=(((N1+N3+1)/2-N2)+1)/2 \qquad \text{Equation 2}$$

Also, the first edge prediction unit 51 may predict a value of a current pixel P3, which is the lower of the two pixels P0 and P3 positioned at the lower-right directional edge, using an average value of values of the pixel P1 above the current pixel P3, the pixel P2 to the left of the current pixel P3, the pixel N1 to the left of the pixel P0 to the upper-left of the current pixel P3, and the pixel N3 above the pixel P0 to the upper-left of the current pixel P3, each of which are neighboring pixels of the current pixel P3, according to Equation 3 below for example, for each color component of the current image.

$$P3=(P1+P2+N1+N3+2)/4 \qquad \text{Equation 3}$$

Also, the first edge prediction unit 51 may predict the current pixel P3, which is the lower of the two pixels P0 and P3 positioned at the lower-right directional edge, by obtaining an average value of values of the pixel P1 above the current pixel P3, and the pixel P2 to the left of the current pixel P3, each of which are neighboring pixels of the current pixel P3, and summing the average value and a gradient value of the upper-left pixel P0 with respect to the current pixel P3 with respect to the current pixel P3, according to Equation 4, for each color component of the current image. Also, the first edge prediction unit 51 may select a neighbor mode corresponding to neighboring pixels used to obtain a predicted value of the current pixel P3 having a smaller difference from the actual value of the current pixel P3 among the predicted values of the current pixel P3, from among two neighbor modes (corresponding to Equations 3 and 4) in which two patterns of neighboring pixels are respectively used, as described above, and may output neighbor mode data corresponding to the selected neighbor mode.

$$P3=(P1+P2+1)/2+\text{delta2}, \text{delta2}=(P2-N1)/8 \qquad \text{Equation 4}$$

The second edge predictor 52 may predict values of two pixels positioned at a lower-left directional edge among the four pixels constructing the current block divided by the splitter 31, using values of neighboring pixels of the two pixels positioned at the lower-left directional edge. In more detail, the second edge prediction unit 52 may predict values of two pixels positioned at a lower-left directional edge among four pixels constructing the current block, using an average value of values of neighboring pixels of one of two areas divided by the lower-left directional edge, and of values of neighboring pixels of the other of the two areas.

FIG. 7 explains a pixel value calculating method such as performed by the second edge prediction unit 52 illustrated in FIG. 4.

Referring to FIG. 7, the second edge prediction unit 52 may predict a value of a current pixel P1, which is the upper pixel of two pixels P1 and P2 positioned at a lower-left directional edge, using an average value of pixels P0 and P3 to the left of and below the current pixel P1, each of which are neighboring pixels of the current pixel P1, according to Equation 5 below, for example, for each color component of the current image.

$$P1=(P0+P3+1)/2 \qquad \text{Equation 5}$$

Also, the second edge prediction unit 52 may predict a value of the current pixel P1, which is the upper pixel of the two pixels P1 and P2 positioned at the lower-left directional edge, using an average value of values of the pixels N4 and P3 located above and below the current pixel P1, each of which are neighboring pixels of the current pixel P1, according to Equation 6 below, for example, for each color component of the current image. Also, the second edge prediction unit 52 may select a neighbor mode corresponding to neighboring pixels used to obtain a predicted value of the current pixel P1 having a smaller difference from the actual value of the current pixel P1 among the predicted values of the current pixel P1, from among two neighbor modes (corresponding to Equations 5 and 6) in which two patterns of neighboring pixels may be respectively used, as described above, and may output neighbor mode data corresponding to the neighbor mode.

$$P1=(N4+P3+1)/2 \qquad \text{Equation 6}$$

Also, the second edge prediction unit 52 may predict a value of a current pixel P2, which is the lower of the two pixels P1 and P2 positioned at the lower-left directional edge, using an average value of the pixels P0 and P3 above and to the right of the current pixel P2, each of which are neighboring pixels of the current pixel P2, according to Equation 7 below for example, for each color component of the current image.

$$P2=(P0+P3+1)/2 \qquad \text{Equation 7}$$

Also, the second edge prediction unit 52 may predict a value of the current pixel P2, which is the lower of the two pixels P1 and P2 positioned at the lower-left directional edge, using an average value of the pixels N0 and P3 to the left and right of the current pixel P2, each of which are neighboring pixels of the current pixel P2, according to Equation 8 below for example, for each color component of the current image. Also, the second edge prediction unit 52 may select a neighbor mode corresponding to neighboring pixels used to obtain a predicted value of the current pixel P2 having a smaller difference from the actual value of the current pixel P2 among the predicted values of the current pixel P1, from among two neighbor modes (corresponding to Equation 7 above and Equation 8 below) in which two patterns of neighboring pixels are respectively used, as described above, and may output neighbor mode data corresponding to the neighbor mode.

$$P2=(N0+P3+1)/2 \qquad \text{Equation 8}$$

The third edge prediction unit 33 may predict values of two pixels positioned at a vertical directional edge, among the four pixels constructing the current block divided by the splitter 31, using values of neighboring pixels of the two pixels positioned at the vertical directional edge. In more detail, the third edge prediction unit 53 may predict values of two pixels positioned at a vertical directional edge among the four pixels constructing the current block, using an average value of values of neighboring pixels of one of two areas divided by the vertical directional edge, and of values of neighboring pixels of the other of the two areas.

FIG. 8 explains a pixel value calculating method such as performed by the third edge prediction unit 53 illustrated in FIG. 4.

Referring to FIG. 8, the third edge prediction unit 53 may predict a value of a current pixel P0, which is the upper pixel of two pixels P0 and P2 positioned at a vertical direction edge, using an average value of values of the pixels N1 and P1 to the left and right of the current pixel P0, each of which are neighboring pixels of the current pixel P0, according to Equation 9 below for example, for each color component of the current image.

$$P0=(N1+P1+1)/2 \qquad \text{Equation 9}$$

Also, the third edge prediction unit 53 may predict a value of the current pixel P0, which is the upper pixel of the two pixels P0 and P2 positioned at the vertical directional edge, by obtaining an average value of pixels N1 and P1 to the left and right of the current pixel P0, each of which are neighboring pixels of the current pixel P0, and summing the average value and a gradient value in a horizontal direction at the pixel N3 above the current pixel P0, according to Equation 10 below for example, for each color component of the current image. Also, the third edge prediction unit 53 may select a neighbor mode corresponding to neighboring pixels used to obtain a predicted value of the current pixel P0 having a smaller difference from the actual value of the current pixel P0 among the predicted values of the current pixel P0, from among two neighbor modes (corresponding to Equation 9 above and Equation 10 below) in which two patterns of neighboring pixels are respectively used, as described above, and may output neighbor mode data corresponding to the neighbor mode.

$$P0=(N1+P1+1)/2+\text{delta1}, \text{delta1}=N3-(N2+N4+1)/2 \qquad \text{Equation 10}$$

Also, the third edge prediction unit 53 may predict a value of a current pixel P2, which is below the two pixels P0 and P1 positioned at the vertical directional edge, using an average value of the pixels N0 and P3 to the left and right of the current pixel P2, each of which are neighboring pixels of the current pixel P2, according to Equation 11 below for example, for each color component of the current image.

$$P2=(N0+P3+1)/2 \qquad \text{Equation 11}$$

Also, the third edge prediction unit 53 may predict a value of the current pixel P2, which is the lower of the two pixels P0 and P2 positioned at the vertical directional edge, by obtaining an average value of values of the left and right pixels N0 and P3 of the current pixel P2, each of which are neighboring pixels of the current pixel P2, and summing the average value and a gradient value in a horizontal direction at the pixel N3 above the pixel P0 above the current pixel P2, according to Equation 12 below for example, for each color component of the current image. Also, the third edge prediction unit 53 may select a neighbor mode corresponding to neighboring pixels used to obtain a predicted value of the current pixel P2 having a smaller difference from the actual value of the current pixel P2 among the predicted values of the current pixel P2, from among two neighbor modes (corresponding to Equation 11 above and Equation 12 below) in which two patterns of neighboring pixels are respectively used, as described above, and may output neighbor mode data corresponding to the neighbor mode.

$$P2=(N0+P3+1)/2+\text{delta2} \qquad \text{Equation 12}$$

In Equation 12, if P0=(N1+P1+1)/2+delta1, "delta2" may correspond to "delta1" in Equation 10, and if P0=(N1+P1+1)/2, "delta2" may correspond to "−delta1".

The fourth edge prediction unit 54 may predict values of two pixels positioned at a horizontal directional edge, among the four pixels constructing the current block divided by the splitter 31, using neighboring pixels of the two pixels positioned at the horizontal directional edge. In more detail, the fourth edge prediction unit 54 may predict values of two pixels positioned at a horizontal directional edge among the four pixels constructing the current block, using an average value of values of neighboring pixels of one of two areas divided by the horizontal directional edge, and of values of neighboring pixels of the other of the two areas.

FIG. 9 explains a pixel value calculating method such as performed by the fourth edge prediction unit 54 illustrated in FIG. 4.

Referring to FIG. 9, the fourth edge prediction unit 54 may predict a value of a current pixel P0, which is the left-most pixel of the two pixels P0 and P1 positioned at a horizontal directional edge, using an average value of values of the pixels N3 and P2 above and below the current pixel P0, each of which are neighboring pixels of the current pixel P0, according to Equation 13 below for example, for each color component of the current image.

$$P0=(N3+P2+1)/2 \qquad \text{Equation 13}$$

Also, the fourth edge prediction unit 54 may predict a value of the current pixel P0, which is the left-most pixel of the two pixels P0 and P1 positioned at the horizontal directional edge, by obtaining an average value of values of the pixels N3 and P2 above and below the current pixel P0, each of which are neighboring pixels of the current pixel P0, and summing the average value and a gradient value in a vertical direction at the pixel N1 to the left of the current pixel P0, according to Equation 14 below for example, for each color component of the current image. Also, the fourth edge prediction unit 54 may select a neighbor mode corresponding to neighboring pixels used to obtain a predicted value of the current pixel P0 having a smaller difference from the actual value of the current pixel P0 among the predicted values of the current pixel P0, from among two neighbor modes (corresponding to Equation 13 above and Equation 14 below) in which two patterns of neighboring pixels are respectively used, as described above, and may output neighbor mode data corresponding to the neighbor mode.

$$P0=(N3+P2+1)/2+\text{delta1}, \text{delta1}=N1-(N2+N0+1)/2 \qquad \text{Equation 14}$$

Also, the fourth edge prediction unit 54 may predict a value of a current pixel P1, which is the right-most pixel of the two pixels P0 and P1 positioned at the horizontal directional edge, using an average value of values of the pixels N4 and P3 above and below the current pixel P1, each of which are neighboring pixels of the current pixel P1, according to Equation 15 below for example, for each color component of the current image.

$$P1=(N4+P3+1)/2 \qquad \text{Equation 15}$$

Also, the fourth edge prediction unit 54 may predict a value of the current pixel P1, which is the right-most pixel of the two pixels P0 and P1 positioned at the horizontal directional edge, by obtaining an average value of values of the pixels N4 and P3 above and below the current pixel P1, each of which are neighboring values of the current pixel P1, and summing the average value and a gradient value in a vertical direction at the pixel N1 to the left of the pixel P0 to the left of the current pixel P1, according to Equation 16 below for example, for each color component of the current image. Also, the fourth edge prediction unit 54 may select a neighbor mode corresponding to neighboring pixels used to obtain a predicted value of the current pixel P1 having a smaller difference from the actual value of the current pixel P1 among the predicted values of the current pixel P1, from among two neighbor modes (corresponding to Equation 15 above and Equation 16 below) in which two patterns of neighboring pixels are respectively used, as described above, and may output neighbor mode data corresponding to the neighbor mode.

$$P1=(N4+P3+1)/2+\text{delta2} \qquad \text{Equation 16}$$

In Equation 16, if P0=(N1+P1+1)/2+delta1, "delta2" may correspond to "delta1" in Equation 10, and if P0=(N1+P1+1)/2, "delta2" may correspond to "−delta1".

The edge mode selection unit 55 may select an edge mode corresponding to an edge direction in which the predicted values (which are predicted respectively by the first edge prediction unit 51, the second edge prediction unit 52, the third edge prediction unit 53, and the fourth edge prediction unit 54) of the four pixels constructing the current block have the smallest differences from original values of the four pixels, from among edge modes respectively corresponding to the four directional edges. Referring to FIGS. 3 and 5, in order to precisely select an edge mode, the first edge prediction unit 51, the second edge prediction unit 52, the third edge prediction unit 53, and the fourth edge prediction unit 54 may predict values of pixels, using values restored by the restoring unit 35, without using actual values of the neighboring pixels of the pixels.

The edge compression unit 56 may output edge mode data indicating the edge mode selected by the edge mode selection unit 55, and neighbor mode data indicating a neighbor mode (corresponding to the edge mode) selected by one among the first edge prediction unit 51, the second edge prediction unit 52, the third edge prediction unit 53, and the fourth edge prediction unit 54, instead of the predicted values of the two pixels, thereby compressing values of the four pixels constructing the current block. Also, the edge compression unit 56 may truncate a part of values of pixels whose values have not been predicted, according to the edge mode selected by the edge mode selection unit 55. In the edge method according to an embodiment, values of R and B components transferred to the image restoring apparatus 23 (see FIG. 2) are each comprised of 4 bits, and a value of a G component transferred to the image restoring apparatus 23 is comprised of 5 bits. That is, the edge compression unit 56 may truncate 4 bits of R component values of pixels whose values have not been predicted, 3 bits of G component values of the pixels, and 4 bits of B component values of the pixels, according to the edge mode selected by the edge mode selection unit 55.

The mode selection unit 34 may select a mode indicating a compression method, from among a plurality of modes corresponding to, for example, the DPCM method, the PCM method, the transformation method, and the edge method, on the basis of the results which are compressed by the first compression unit 32 and the second compression unit 33. In more detail, the mode selection unit 34 may calculate differences between values of the four pixels constructing the current block, which are restored according to the DPCM method, the PCM method, and the transformation method used by the restoring unit 35, and the edge method used by the second compression unit 33, and actual values of the four pixels constructing the current block divided by the splitter 31, and may select a mode indicating an image compression method in which the difference is a minimum, from among the plurality of modes corresponding to the DPCM method, the PCM method, the transformation method, and the edge method. Specifically, in an embodiment, since differences corresponding to R, G, and B components exist separately, the mode selection unit 34 may select a mode in which a sum of differences corresponding to the R, G, and B components is minimum, from among the plurality of modes.

The restoring unit 35 may restore values of the four pixels constructing the current block using data compressed by the first compression unit 32, according to, for example, the DPCM method, the PCM method, and the transformation method. Also, the restoring unit 35 may extract compressed values A and B of two pixels of the four pixels constructing the current block from the data compressed by the second compression unit 33, may add a predetermined binary value to the compressed values A and B of the two pixels, and may predict values of two pixels positioned at a directional edge corresponding to the edge mode selected by the edge mode selection unit 55, using values of neighboring pixels of the two pixels positioned at the directional edge, thereby restoring values of the four pixels constructing the current block. A more detailed description of the restoring unit 35 is omitted herein, and details therefor will be given in the following description related to the operations of a first restoring unit 113 and a second restoring unit 114 illustrated in FIG. 11.

Returning to FIGS. 2 and 3, the bit packing unit 36 may generate mode data indicating the mode selected by the mode selection unit 34, and a bit stream packet including compressed data corresponding to the mode, and output the mode data and the bit stream packet to the memory 22. In particular, if the mode selected by the mode selection unit 34 corresponds to the edge method, the compressed data typically includes edge mode data indicating a edge mode selected by the second compression unit 33, reference data representing a neighbor mode selected by the second compression unit 33, and values A and B of two pixels truncated by the second compression unit 33.

Figure 10:
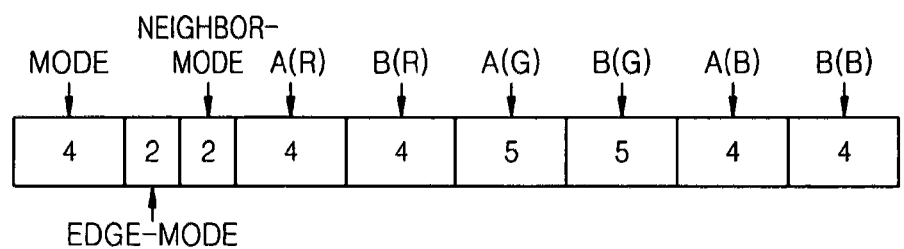
FIG. 10 illustrates an exemplary bit stream packet such as generated by a bit packing unit illustrated in FIG. 3.

FIG. 10 illustrates an example of a bit stream packet such as generated by the bit packing unit 36 illustrated in FIG. 3

Referring to FIG. 10, a bit stream packet generated by the bit packing unit 36 illustrated in FIG. 3 typically includes 4 bits of mode data, 2 bits of edge mode data, 2 bits of neighbor-mode data, 8 bits of compressed values A and B of two pixels corresponding to an R component, wherein 4 bits are assigned to each pixel, 10 bits of compressed values A and B of two pixels corresponding to a G component, wherein 5 bits are assigned to each pixel, and 8 bits of compressed values A and B of two pixels corresponding to a B component, wherein 4 bits are assigned to each pixel. As illustrated in FIG. 10, the bit packing unit 36 may assign 4 bits to each of compressed values A and B of two pixels corresponding to each of R and B components, and may assign 5 bits to each of compressed values A and B of two pixels corresponding to a G component, thereby generating a total of 34 bits of a bit stream packet. In order to accurately ⅓ compress 96 bits of an original 2×2 block, that is, in order to generate a total of 32 bits of a bit stream packet, 4 bits may be assigned to each of compressed values A and B of two pixels corresponding to each of R, G, and B components.

Figure 11:
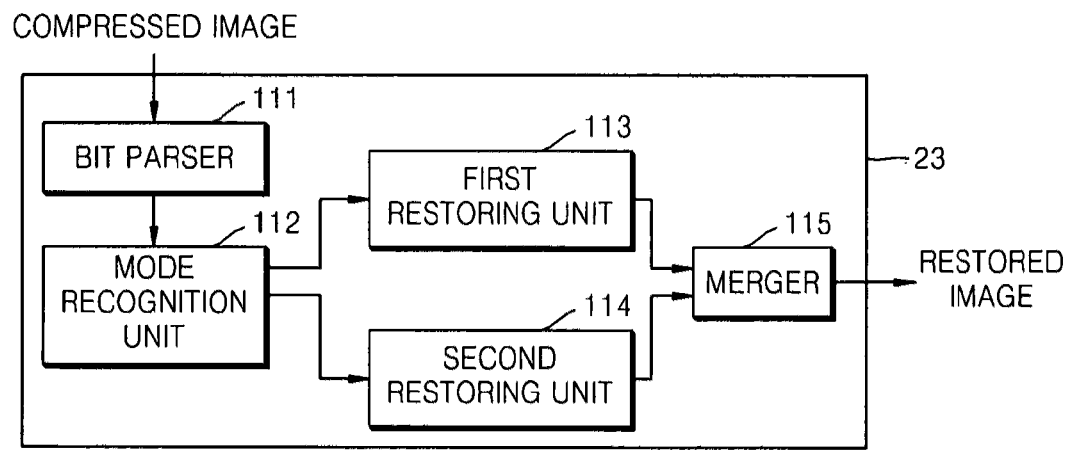
FIG. 11 illustrates an image restoring apparatus such as illustrated in FIG. 2.

FIG. 11 illustrates the image restoring apparatus 23 such as illustrated in FIG. 2.

Referring to FIG. 11, the image restoring apparatus 23 may include, for example, a bit parser 111, a mode recognition unit 112, a first restoring unit 113, a second restoring unit 114, and a merger 115. In order to further enhance an image compression rate, the image restoring apparatus 23 may further include different or additional components, such as a decoder for performing entropy-decoding, other than the components illustrated in FIG. 11.

The bit parser 111 may read a bit stream packet from the memory 22 (see FIG. 2), parse the bit stream packet to extract from the bit stream packet compressed data of a current block and mode data indicating an image compression method among the DPCM method, the PCM method, the transformation method, and the edge method, which is used by the image compression apparatus 21, and may output the compressed data of the current block and the mode data to the mode recognition unit 112. Specifically, if the mode data indicates the edge method, the compressed data of the current block may include edge mode data indicating one of four edge modes, neighbor mode data indicating one of two neighbor modes, and values A and B of two pixels among four pixels constructing the current block.

The mode recognition unit 112 may recognize an edge mode, a neighbor mode, and a mode corresponding to an image compression method that is used by the image compression apparatus 21, from the mode data extracted by the bit parser 111. The mode recognition unit 112 may output the compressed data extracted by the bit parser 111 to the first restoring unit 113 if the recognized mode is one of the DPCM method, the PCM method, and the transformation method, and may output the compressed data extracted by the bit parser 11 to the second restoring unit 114 if the recognized mode is the edge mode.

If the recognized mode is one of the DPCM method, the PCM method, and the transformation method, the first restoring unit 113 may restore values of the four pixels constructing the current block, using the compressed data extracted by the bit parser 111, according to the recognized mode. In more detail, if the recognized mode is a mode based on the DPCM method, the first restoring unit 113 generally shifts the compressed data extracted by the bit parser 111 by the number of bits corresponding to the recognized mode in a direction to the left, according to the DPCM method, adds a predetermined binary value corresponding to the recognized mode to the result of the shifting, restores differences between values of the four pixels constructing the current block and values of four pixels constructing a reference block, and adds the restored differences to the values of the four pixels constructing the reference block, thereby restoring the values of the four pixels constructing the current block. If the recognized mode indicates the PCM method, the first restoring unit 113 may add a predetermined binary value to the compressed data extracted by the bit parser 111, thereby restoring values of the four pixels constructing the current block. Also, if the recognized mode indicates the transformation method, the first restoring unit 113 may perform Inverse Discrete Cosine Transformation (IDCT), etc. on the compressed data extracted by the bit parser 111, according to the transformation method, thereby restoring values of the four pixels constructing the current block.

The second restoring unit 114 generally extracts compressed values A and B of two pixels of the four pixels constructing the current block, from the compressed data extracted by the bit parser 111, adds a predetermined binary value to the compressed values A and B of the two pixels, and predicts values of two pixels positioned at a directional edge corresponding to the edge mode recognized by the edge mode recognition unit 112, using values of neighboring pixels of the two pixels, thereby restoring values of the four pixels constructing the current block. As described above, in an embodiment, the neighboring pixels may include at least two or more pixels among the pixels constructing the current block and pixels constructing the neighboring blocks of the current block, wherein the values of the pixels constructing the current block are values restored by the addition of the predetermined binary value, as described above. The values of the pixels constructing the neighboring blocks of the current block may be values restored according to the image compression methods applied to the neighboring blocks.

Figure 12:
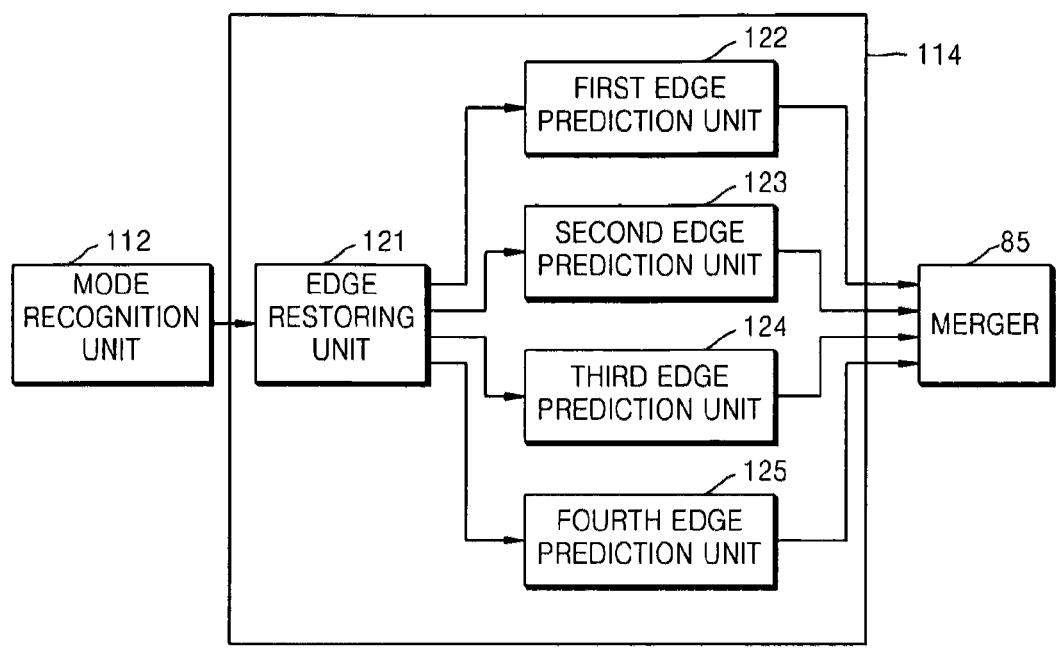
FIG. 12 illustrates a second restoring unit such as illustrated in FIG. 11.

FIG. 12 illustrates the second restoring unit 114 such as illustrated in FIG. 11.

Referring to FIG. 12, the second restoring unit 114 may include, for example, an edge restoring unit 121, a first edge prediction unit 122, a second edge prediction unit 123, a third edge prediction unit 124, and a fourth edge prediction unit 125. In particular, the first edge prediction unit 122, the second edge prediction unit 123, the third edge prediction unit 124, and the fourth edge prediction unit 125 may predict values of two pixels of four pixels constructing a current block, like the first edge prediction unit 51, the second edge prediction unit 52, the third edge prediction unit 53, and the fourth edge prediction unit 54 of the image compression apparatus 21 (see e.g. FIG. 5).

The edge restoring unit 121 may extract compressed values A and B of two pixels of four pixels constructing a current block, from compressed data extracted by the bit parser 111, and may add a predetermined binary value to the compressed values A and B of the two pixels, thereby restoring values of the two pixels of the four pixels constructing the current block, for each color component of a current image. For example, the edge restoring unit 121 may extract 8 bits of compressed values A and B, each compressed value having 4 bits corresponding to R components of two pixels of four pixels constructing a current block from compressed data extracted by the bit parser 111, and may add 4 bits of a binary value to the 4 bits of each compressed value, thereby restoring values of the two pixels of the four pixels constructing the current block, for each color component of a current image. The edge restoring unit 121 may restore values of two pixels of the four pixels constructing the current block by applying the same method as described above to G and B component values.

Also, the edge restoring unit 121 may output the restored values of the two pixels to one corresponding to an edge mode recognized by the mode recognition unit 112, among the first edge prediction unit 122, the second edge prediction unit 123, the third edge prediction unit 125, and the fourth edge prediction unit 125.

If the edge mode recognized by the mode recognition unit 112 indicates a lower-right directional edge, the first edge prediction unit 122 may predict values of two pixels positioned at the lower-right directional edge, among the four pixels constructing the current block, using values of neighboring pixels of the two pixels. In more detail, the first edge prediction unit 122 may predict values of pixels positioned at the lower-right directional edge, using an average value of values of neighboring pixels positioned in one of two areas divided by the lower-right directional edge, and of values of neighboring pixels positioned in the other of the two areas. This will be described in more detail with reference to FIG. 6, below.

Referring to FIG. 6, if the edge mode recognized by the mode recognition unit 112 indicates a lower-right directional edge and a neighbor mode recognized by the mode recognition unit 112 represents neighboring pixels according to the pattern of Equation 1, the first edge prediction unit 122 may predict a value of a current pixel P0, which is the upper pixel of two pixels P0 and P3 positioned at the lower-right directional edge, using an average value of values of the pixels P1, N1, P2, and N3 to the left and right of, and below and above, the current pixel P0, each of which are neighboring pixels of the current pixel P0, according to Equation 1, for each color component of a current image.

Also, if the edge mode recognized by the mode recognition unit 112 is the lower-right directional edge and the neighbor mode recognized by the mode recognition unit 112 represents neighboring pixels according to the pattern of Equation 2, the first edge prediction unit 122 may predict a value of the current pixel P0, which is the upper pixel of the two pixels P0 and P3 positioned at the lower-right directional edge, by summing a value of the pixel N2 to the upper-left of the current pixel P0, and a gradient value of the pixel P3 to the lower-right of the current pixel P0 with respect to the current pixel P0, according to Equation 2, for each color component of the current image.

Also, if the edge mode recognized by the mode recognition unit 112 indicates the lower-right directional edge and the neighbor mode recognized by the mode recognition unit 112 represents neighboring pixels according to the pattern of Equation 3, the first edge prediction unit 122 may predict a value of a current pixel P3, which is the lower of the two pixels P0 and P3 positioned at the lower-right directional edge, using an average value of values of the pixel P1 above the current pixel P3, the pixel P2 to the left of the current pixel P3, the pixel P0 to the upper-left of the current pixel P3, the pixel N1 to the left of the pixel P0 to the upper-left of the current pixel P3, and the pixel N3 above the pixel P0 to the upper-left of the current pixel P3, according to Equation 3, for each color component of the current image.

Also, if the edge mode recognized by the mode recognition unit 112 indicates the lower-right directional edge and the neighbor mode recognized by the mode recognition unit 112 represents neighboring pixels according to the pattern of Equation 4, the first edge prediction unit 122 may predict a value of the current pixel P3, which is the lower of the two pixels P0 and P3 positioned at the lower-right directional edge, by obtaining an average value of values of the pixels P1 and P2 above and to the left of the current pixel P3, each of which are neighboring pixels of the current pixel P3, and summing the average value and a gradient value of the pixel P0 to the upper-left of the current pixel P3 with respect to the current pixel P3, according to Equation 4, for each color component of the current image. In an embodiment, since the neighbor mode data is used to predict values of two pixels, the neighbor mode data may indicate one of Equations 1 and 2 and one of Equations 3 and 4. As a result, the first edge prediction unit 122 may predict values of two pixels of four pixels constructing a current block. This may be applied in the same way to the following embodiments.

If the edge mode recognized by the mode recognition unit 112 indicates a lower-left directional edge, the second edge prediction unit 123 may predict values of two pixels positioned at the lower-left directional edge among the four pixels constructing the current block, using values of neighboring pixels of the two pixels. In more detail, the second edge prediction unit 123 may predict values of pixels positioned at a lower-left directional edge, using an average value of values of neighboring pixels positioned in one of two areas divided by the lower-left directional edge, and of values of neighboring pixels positioned in the other of the two areas. The operation will be described in more detail with reference to FIG. 7, below.

If the edge mode recognized by the mode recognition unit 112 indicates a lower-left directional edge and a neighbor mode recognized by the mode recognition unit 112 represents neighboring pixels according to the pattern of Equation 5, the second edge prediction unit 123 may predict a value of a current pixel P1, which is the upper pixel of two pixels P1 and P2 positioned at the lower-left directional edge, using an average value of values of the pixels P0 and P3 to the left of and below the current pixel P1, each of which are neighboring pixels of the current pixel P1, according to Equation 5, for each color component of the current image.

Also, if the edge mode recognized by the mode recognition unit 112 indicates the lower-left directional edge and the neighbor mode recognized by the mode recognition unit 112 represents neighboring pixels according to the pattern of Equation 6, the second edge prediction unit 123 may predict a value of the current pixel P1, which is the upper pixel of the two pixels P1 and P2 positioned at the lower-left directional edge, using an average value of values of the pixels N4 and P3 above and below the current pixel P1, which correspond to neighboring pixels of the current pixel P1, according to Equation 6, for each color component of a current image. Also, the second edge prediction unit 123 may select a neighbor mode corresponding to neighboring pixels used to obtain a predicted value of the current pixel P1 having a smaller difference from the actual value of the current pixel P1 among the predicted values of the current pixel P1, from among two neighbor modes in which two patterns of neighboring pixels are respectively used, as described above, and may output neighbor mode data corresponding to the neighbor mode.

Also, if the edge mode recognized by the mode recognition unit 112 indicates the lower-left directional edge and the neighbor mode recognized by the mode recognition unit 112 represents neighboring pixels according to the pattern of Equation 7, the second edge prediction unit 123 may predict a value of a current pixel P2, which is the lower of the two pixels P1 and P2 positioned at the lower-left directional edge, using an average value of values of the pixels P0 and P3 above and to the right of the current pixel P2, each of which are neighboring pixels of the current pixel P2, according to Equation 7, for each color component of the current image.

Also, if the edge mode recognized by the mode recognition unit 112 indicates the lower-left directional edge and the neighbor mode recognized by the mode recognition unit 112 represents neighboring pixels according to the pattern of Equation 8, the second edge prediction unit 123 may predict a value of the current pixel P2, which is the lower of the two pixels P1 and P2 positioned at the lower-left directional edge, using an average value of values of the pixels N0 and P3 to the left and right of the current pixel P2, each of which are neighboring pixels of the current pixel P2, according to Equation 8, for each color component of the current image.

If the edge mode recognized by the mode recognition unit 112 indicates a vertical directional edge, the third edge prediction unit 124 may predict values of two pixels positioned at the vertical direction edge among the four pixels constructing the current block, using values of neighboring pixels of the two pixels. In more detail, the third edge prediction unit 124 may predict values of pixels positioned at a vertical directional edge, using an average value of values of neighboring pixels positioned in one of two areas divided by the vertical directional edge, and of values of neighboring pixels positioned in the other of the two areas. The operation will be described in more detail with reference to FIG. 8.

If the edge mode recognized by the mode recognition unit 112 indicates the vertical directional edge and a neighbor mode recognized by the mode recognition unit 112 represents neighboring pixels according to the pattern of Equation 9, the third edge prediction unit 124 may predict a value of a current pixel P0, which is the upper pixel of two pixels P0 and P2 positioned at the vertical directional edge, using an average value of values of the pixels N1 and P1 to the left and right of the current pixel P0, each of which are neighboring pixels of the current pixel P0, according to Equation 9, for each color component of the current image.

If the edge mode recognized by the mode recognition unit 112 indicates the vertical directional edge and the neighbor mode recognized by the mode recognition unit 112 represents neighboring pixels according to the pattern of Equation 10, the third edge prediction unit 124 may predict a value of the current pixel P0, which is the upper pixel of the two pixels P0 and P2 positioned at the vertical directional edge, by obtaining an average value of values of the pixels N1, P1, N3, and P2 to the left and right of and above and below the current pixel P0, each of which are neighboring pixels of the current pixel P0, and summing the average value and a gradient value in a horizontal direction at the upper pixel N3 of the current pixel P0, according to Equation 10, for each color component of the current image.

Also, if the edge mode recognized by the mode recognition unit 112 indicates the vertical directional edge and the neighbor mode recognized by the mode recognition unit 112 represents neighboring pixels according to the pattern of Equation 11, the third edge prediction unit 124 may predict a value of a current pixel P2, which is the lower of the two pixels P0 and P2 positioned at the vertical directional edge, using an average value of values of the pixels N0 and P3 to the left and right of the current pixel P2, each of which are neighboring pixels of the current pixel P2, according to Equation 11, for each color component of the current image.

Also, if the edge mode recognized by the mode recognition unit 112 indicates the vertical directional edge and the neighbor mode recognized by the mode recognition unit 112 represents neighboring pixels according to the pattern of Equation 12, the third edge prediction unit 124 may predict a value of the current pixel P2, which is the lower of the two pixels P0 and P2 positioned at a vertical directional edge, by obtaining an average value of values of the pixels N0 and P3 to the left and right of the current pixel P2, each of which are neighboring pixels of the current pixel P2, and summing the average value and a gradient value in a horizontal direction at the pixel N3 above the pixel P0 above the current pixel P2, according to Equation 12, for each color component of the current image.

If the edge mode recognized by the mode recognition unit 112 indicates a horizontal directional edge, the fourth edge prediction unit 125 may predict values of two pixels positioned at the horizontal direction edge among the four pixels constructing the current block, using values of neighboring pixels of the two pixels. In more detail, the fourth edge prediction unit 125 may predict values of pixels positioned at the lower-right directional edge, using an average value of values of neighboring pixels positioned in one of two areas divided by the horizontal directional edge, and of values of neighboring pixels positioned in the other of the two areas. This will be described in more detail with reference to FIG. 9.

If the edge mode recognized by the mode recognition unit 112 indicates a horizontal directional edge and a neighbor mode recognized by the mode recognition unit 112 represents neighboring pixels according to the pattern of Equation 13, the fourth edge prediction unit 125 may predict a value of a current pixel P0, which is the left-most pixel of the two pixels P0 and P1 positioned at the horizontal directional edge, using an average value of values of the pixels N3 and P2 above and below the current pixel P0, each of which are neighboring pixels of the current pixel P0, according to Equation 13, for each color component of the current image.

Also, if the edge mode recognized by the mode recognition unit 112 indicates the horizontal directional edge and the neighbor mode recognized by the mode recognition unit 112 represents neighboring pixels according to the pattern of Equation 14, the fourth edge prediction unit 125 may predict a value of the current pixel P0, which is the left-most pixel of the two pixels P0 and P1 positioned at the horizontal directional edge, by obtaining an average value of values of the pixels N3 and P2 above and below the current pixel P0, each of which are neighboring pixels of the current pixel P0, and summing the average value and a gradient value in a vertical direction at the pixel N1 to the left of the current pixel P0, according to Equation 13, for each color component of the current image.

Also, if the edge mode recognized by the mode recognition unit 112 indicates the horizontal directional edge and the neighbor mode recognized by the mode recognition unit 112 represents neighboring pixels according to the pattern of Equation 15, the fourth edge prediction unit 125 may predict a value of a current pixel P1, which is the right-most pixel of the two pixels P0 and P1 positioned at the horizontal directional edge, using an average value of values of the pixels N4 and P3 above and below the current pixel P1, each of which are neighboring pixels of the current pixel P1, according to Equation 15, for each color component of the current image.

Also, if the edge mode recognized by the mode recognition unit 112 indicated the horizontal directional edge and the neighbor mode recognized by the mode recognition unit 112 represents neighboring pixels according to the pattern of Equation 16, the fourth edge prediction unit 125 may predict a value of the current pixel P1, which is the right-most pixel of the two pixels P0 and P1 positioned at the horizontal directional edge, by obtaining an averaging value of values of the pixels N4 and P3 above and below the current pixel P1, and summing the average value and a gradient value in a vertical direction at the pixel N1 to the left of the pixel P0 to the left of the current pixel P1, according to Equation 4, for each color component of the current image.

Figure 13:
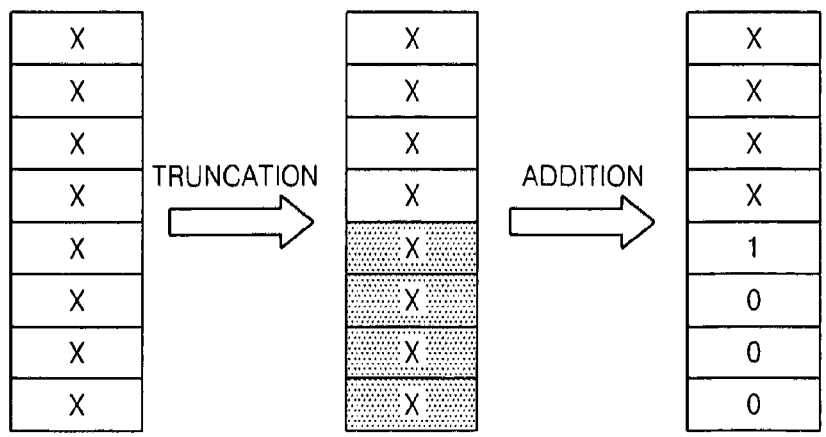
FIG. 13 explains a process of performing truncation and addition of 8 bits of a pixel value according to an edge method, according to an embodiment of the present invention.

FIG. 13 explains a process of truncating and adding 8 bits of a pixel value according to the edge method, according to an embodiment of the present invention.

Referring to FIGS. 2 and 13, the image compression apparatus 21 typically truncates 4 bits from 8 bits of an R component value. Successively, the image restoring apparatus 23 may add a 4-bit value "1000" to the 4 bits of compressed data, thereby restoring the 8 bits of the R component value. In an embodiment, a reason for adding the 4-bit value "1000" may include the fact that the 4-bit value "1000" is an intermediate value among all possible values that can be represented by 4 bits. Likewise, a 3-bit value "100" may be added to a G component value, and the 4-bit value "1000" may be added to a B component value. However, embodiments of the present invention are not limited to this, and different values may be added to R, G, and B component values in order to improve image compression efficiency and picture quality of restored images.

Referring to FIG. 11, the merger 115 may merge 2×2 blocks, each 2×2 block having a total of 96 bits and consisting of four 8-bit pixels for each of R, G, and B components restored by the first restoring unit 113 or the second restoring unit 114, thereby reconstructing the current image.

Figure 14:
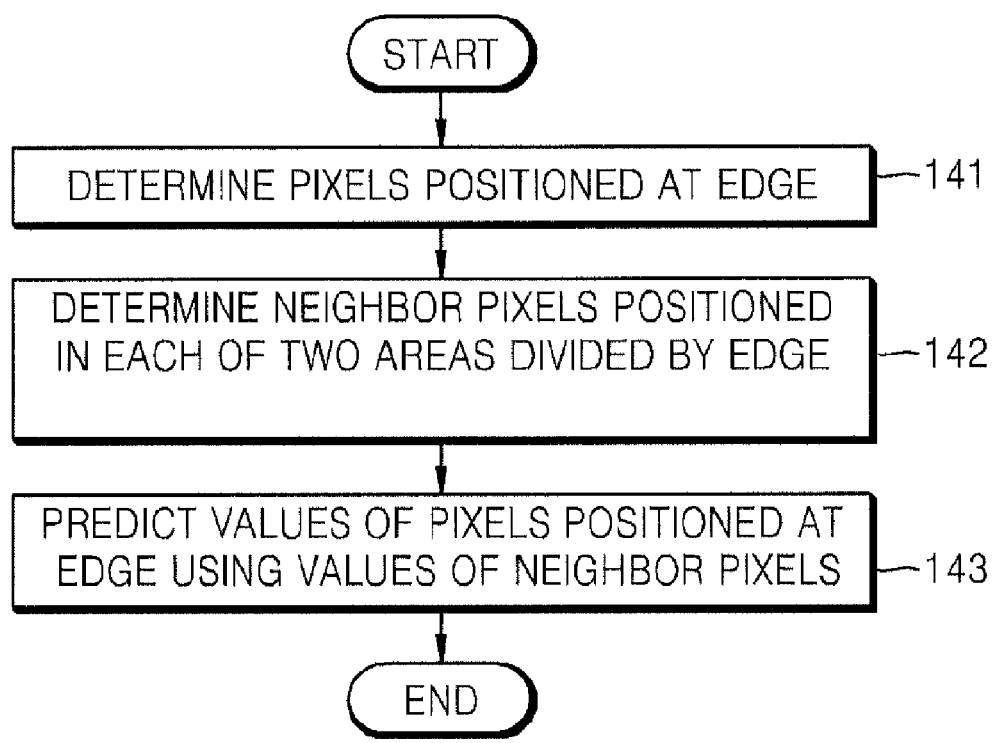
FIG. 14 illustrates a pixel value prediction method, according to an embodiment of the present invention.

FIG. 14 illustrates a pixel value prediction method, according to an embodiment of the present invention.

Referring to FIG. 14, the pixel value prediction method may include, for example, operations that are sequentially processed by the first edge prediction unit 51, the second edge prediction unit 52, the third edge prediction unit 53, and the fourth edge prediction unit 54 as illustrated in FIG. 5, or by the first edge prediction unit 122, the second edge prediction unit 123, the third edge prediction unit 124, and the fourth edge prediction unit 125 as illustrated in FIG. 12. Accordingly, the above descriptions related to the first edge prediction unit 51, the second edge prediction unit 52, the third edge prediction unit 53, and the fourth edge prediction unit 54 as illustrated in FIG. 5, and the first edge prediction unit 122, the second edge prediction unit 123, the third edge prediction unit 124, and the fourth edge prediction unit 125 may also be applied to the pixel value prediction method. Alternatively, the pixel value prediction method may equally be performed by other units not previously described herein. In particular, operations which are processed in common by the edge prediction units will be described in more detail, below.

In operation 141, an edge prediction unit may determine pixels positioned at a directional edge of four directional edges, among four pixels constructing a 2×2 current block in a current image, for each color component of the current image.

In operation 142, the edge prediction unit may determine neighboring pixels positioned in each of two areas divided by the directional edge, for each color component of the current image. In more detail, in operation 142, the edge prediction unit may determine neighboring pixels positioned in one area of two areas divided by the directional edge, and neighboring pixels positioned in the other area of the two areas, for each color component of the current image.

In operation 143, the edge prediction unit may predict values of the pixels determined in operation 141, using values of the neighboring pixels determined in operation 142. For example, if the directional edge is a lower-right directional edge, in operation 143, the edge prediction unit may predict a value of a current pixel, which is the upper pixel of pixels positioned at the lower-right directional edge using an average value of values of the pixels to the left and right of, and below and above, the current pixel, or by summing a value of the pixel to the upper-left of the current pixel and a gradient value of the pixel to the lower-right of the current pixel.

Figure 15:
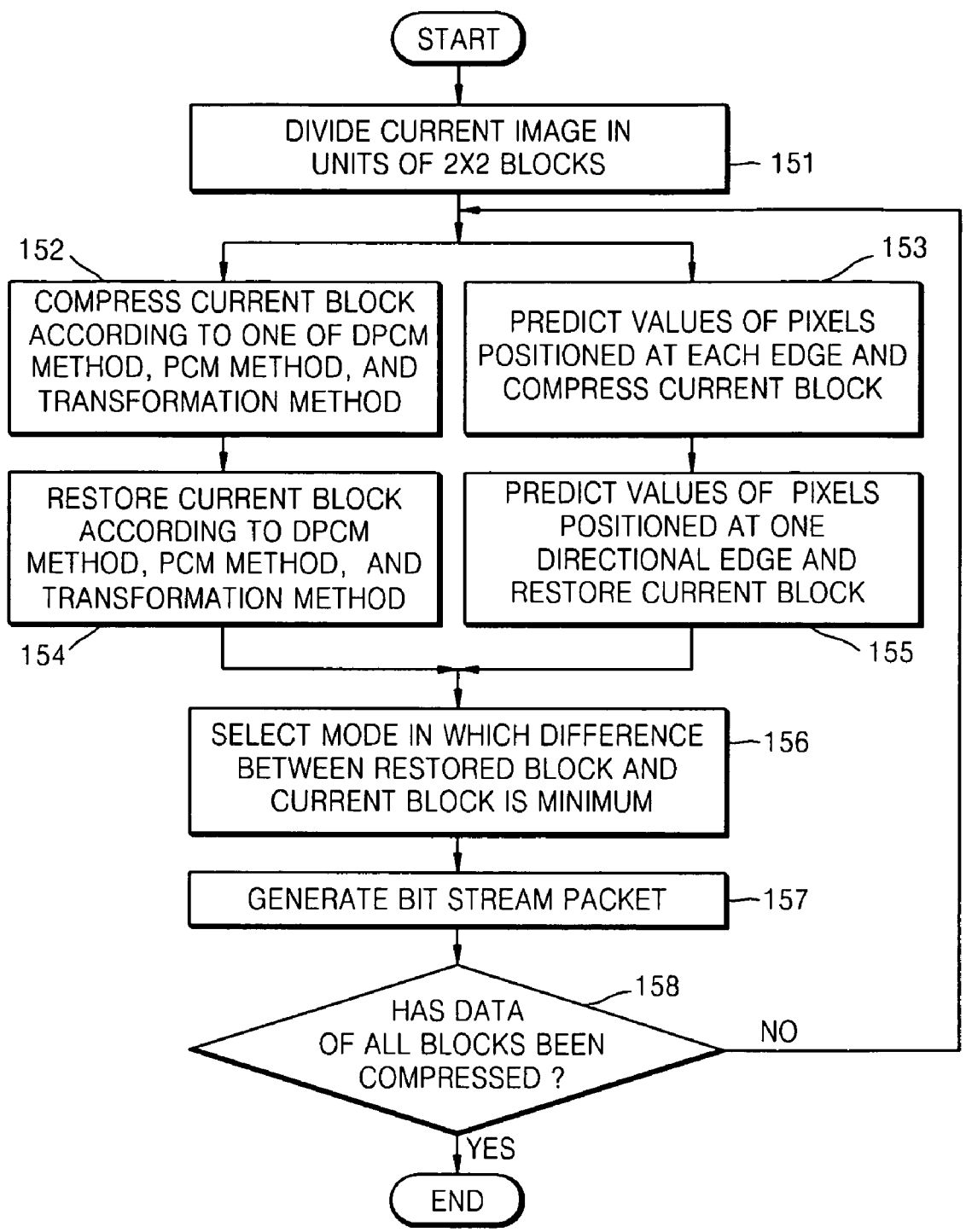
FIG. 15 illustrates an image compression method, according to an embodiment of the present invention.

FIG. 15 illustrates an image compression method, according to an embodiment of the present invention.

Referring to FIGS. 3 and 15, the image compression method may include, for example, operations that are sequentially processed by the image compression apparatus 21. Accordingly, the above descriptions related to the image compression apparatus 21 may also be applied to the image compression method. Alternatively, the image compression method may equally be performed by other image compression apparatuses not previously described herein.

In operation 151, the image compression apparatus 21 may receive a current image and divide the current image in units of 2×2 blocks.

In operation 152, the image compression apparatus 21 may compress values of four pixels constructing a current block divided by the splitter 31 (see FIG. 5), according to the DPCM method, the PCM method, and the transformation method, for example.

In operation 153, the image compression apparatus 21 may predict values of two pixels positioned at each of four directional edges, among the four pixels constructing the current block, using values of neighboring pixels of the two pixels, and may truncate a part of values of non-predicted pixels among the four pixels constructing the current block, thereby compressing values of the four pixels constructing the current block.

In operation 154, the image compression apparatus 21 may restore values of the four pixels constructing the current block, using the data compressed in operation 152, according to the DPCM method, the PCM method, and the transformation method, for example.

In operation 155, the image compression apparatus 21 may extract compressed values A and B of two pixels from the data compressed in operation 153, add a predetermined binary value to the compressed values A and B of the two pixels, and may predict values of two pixels positioned at the directional edge using values of neighboring pixels of the two pixels positioned at the directional edge, thereby restoring values of the four pixels constructing the current block.

In operation 156, the image compression apparatus 21 may calculate differences between the values of the four pixels constructing the current block, which values are restored in operations 154 and 155, and actual values of the four pixels constructing the current block divided in operation 151, and may select a mode indicating an image compression method in which the difference is a minimum, from among a plurality of modes corresponding to the DPCM method, the PCM method, the transformation method, and the edge method, for example.

In operation 157, the image compression apparatus 21 may generate a bit stream packet including mode data indicating the mode selected in operation 156, and compressed data corresponding to the mode.

In operation 158, the image compression apparatus 21 may determine whether data of all blocks constructing the current image has been completely compressed, and may return to operation 152 if the data compression is not complete and terminate the process if the data compression is complete.

Figure 16:
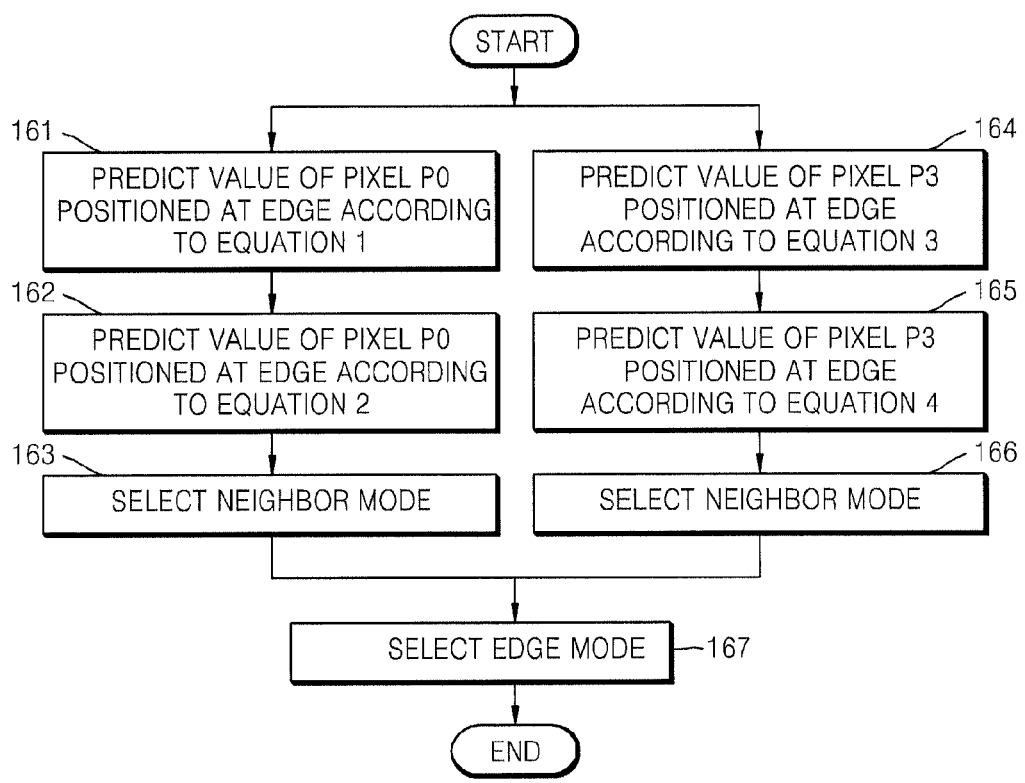
FIG. 16 illustrates an image compression method such as that corresponding to operation 153 illustrated in FIG. 15.

FIG. 16 illustrates an image compression method, such as corresponding to operation 153 illustrated in FIG. 15.

Referring to FIG. 16, the image compression method corresponding to operation 153, such as illustrated in FIG. 15, may include operations which are sequentially processed by the second compression unit 33. Accordingly, the above descriptions related to the second compression unit 33 illustrated in FIG. 5 may also be applied to the image compression method.

Referring to FIGS. 6 and 16, in operation 161, the second compression unit 33 may predict a value of a current pixel P0, which is the upper pixel of two pixels P0 and P3 positioned at a lower-right directional edge, using an average value of values of the pixels P1, N1, P2, and N3 to the right and left of, and below and above, the current pixel P0, each of which are neighboring pixels of the current pixel P0, according to Equation 1, for each color component of a current image.

In operation 162, the second compression unit 33 may predict a value of the current pixel P0, which is the upper pixel of the two pixels P0 and P3 at the lower-right directional edge, by summing a value of the pixel N2 to the upper left of the current pixel P0 and a gradient value of the pixel P3 to the lower-right of the current pixel P0 with respect to the current pixel P0, according to Equation 2, for each color component of the current image.

In operation 163, the second compression unit 33 may select a neighbor mode corresponding to neighboring pixels used to obtain a predicted value of the current pixel P0 having a smaller difference from the actual value of the current pixel P0 among the predicted values of the current pixel P0, from among two neighbor modes (corresponding to Equations 1 and 2) in which two patterns of neighboring pixels are respectively used, as described above.

In operation 164, the second compression unit 33 may predict a value of a current pixel P3, which is the lower of the two pixels P0 and P3 positioned at the lower-right directional edge, using an average value of values of the pixel P1 above the current pixel P3, the left pixel P2 of the current pixel P3, the pixel P0 to the upper-left of the current pixel P3, and the pixel N3 above the pixel P0 to the upper-left of the current pixel P3, each of which are neighboring pixels of the current pixel P3, according to Equation 3, for each color component of the current image.

In operation 165, the second compression unit 33 may predict a value of the current pixel P3, which is the lower of the two pixels P0 and P3 positioned at the lower-right directional edge, by obtaining an average value of the pixels P1 and P2 above and to the left of the current pixel P3, each of which are neighboring pixels of the current pixel P3, and summing the average value and a gradient value of the pixel P0 to the upper-left of the current pixel P3 with respect to the current pixel P3, according to Equation 4, for each color component of the current image.

In operation 166, the second compression unit 33 may select a neighbor mode corresponding to neighboring pixels used to obtain a predicted value of the current pixel P3 having a smaller difference from the actual value of the current pixel P3 among the predicted values of the current pixel P3, from among two neighbor modes (corresponding to Equations 3 and 4) in which two patterns of neighboring pixels are respectively used, as described above.

In operation 167, the second compression unit 33 may select an edge mode indicating a directional edge in which a sum of differences between the predicted values of the four pixels and actual values of the four pixels is a minimum among the values predicted in operations 161 through 164 and values predicted with respect to the remaining three directional edges except for the lower-right directional edge. Edge prediction methods for the remaining three directional edges other than the lower-right directional edge have not been described in detail. However, it may be understood by one of ordinary skill in the art that the edge prediction methods for the remaining three directional edges can be sufficiently implemented from the above descriptions and are processed concurrently with the operations 161 through 165.

In operation 167, the second compression unit 33 may output edge mode data indicating the edge mode and neighbor mode data representing a neighbor mode corresponding to the edge mode, instead of predicted values of two pixels corresponding to the edge mode selected in operation 166, thereby compressing values of the four pixels constructing the current block.

Figure 17:
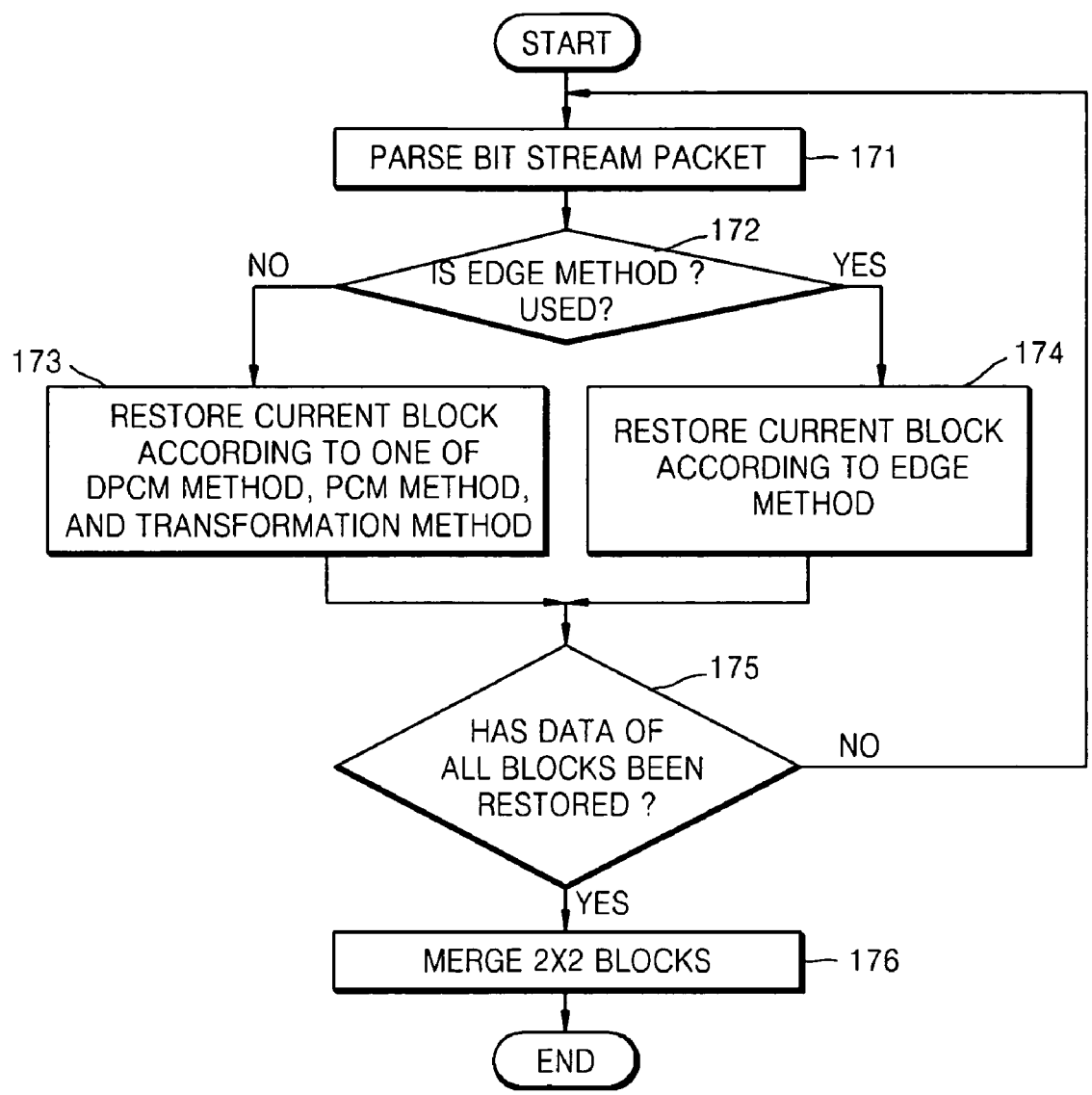
FIG. 17 illustrates an image restoring method, according to an embodiment of the present invention.

FIG. 17 illustrates an image restoring method, according to an embodiment of the present invention.

Referring to FIG. 17, the image restoring method may include, for example, operations that are sequentially processed by the image restoring apparatus 23 such as illustrated in FIG. 3. The above descriptions related to the image restoring apparatus 23 illustrated in FIG. 3 may also be applied to the image compression method. Alternatively, the image restoring method may equally be performed by other image restoring apparatuses not previously described herein.

Referring to FIGS. 2 and 17, in operation 171, the image restoring apparatus 23 may read a bit stream packet from the memory 22, parse the bit stream packet, and extract compressed data of a current block and mode data indicating an image compression method used by the image compression apparatus 21, among a variety of image compression methods, from the bit stream packet.

In operation 172, the image restoring apparatus 23 may recognize a mode indicating an image compression method used by the image compression apparatus 21, among a variety of image compression methods, an edge mode, and a neighbor mode, from the mode data extracted in operation 171. If the recognized mode indicates one of the DPCM method, the PCM method, and the transformation method, the process proceeds to operation 173, and if the recognized mode indicates the edge mode, the process proceeds to operation 174.

In operation 173, the image restoring apparatus 23 may restore values of the four pixels constructing the current block using the compressed data extracted in operation 171, according to the corresponding method among the DPCM method, the PCM method, and the transformation method, for example.

In operation 174, the image restoring apparatus 23 may extract compressed values A and B of two pixels of the four pixels constructing the current block, from the compressed data extracted in operation 171, add a predetermined binary value to the compressed values A and B of the two pixels, and may predict values of two pixels positioned at a directional edge corresponding to the edge mode recognized in operation 172 using values of neighboring pixels of the two pixels, thereby restoring values of the four pixels constructing the current block.

In operation 175, the image restoring apparatus 23 may determine whether data of all blocks constructing the current image has been completely restored, and may return to operation 171 if the data restoration is not complete, and proceed to operation 176 if the data restoration is complete.

In operation 176, the image restoring apparatus 23 may merge 2×2 blocks, each 2×2 block having a total of 96 bits and consisting of four 8-bit pixels for each of R, G, and B components restored in operation 173 or 174, thereby reconstructing the current image.

Figure 18:
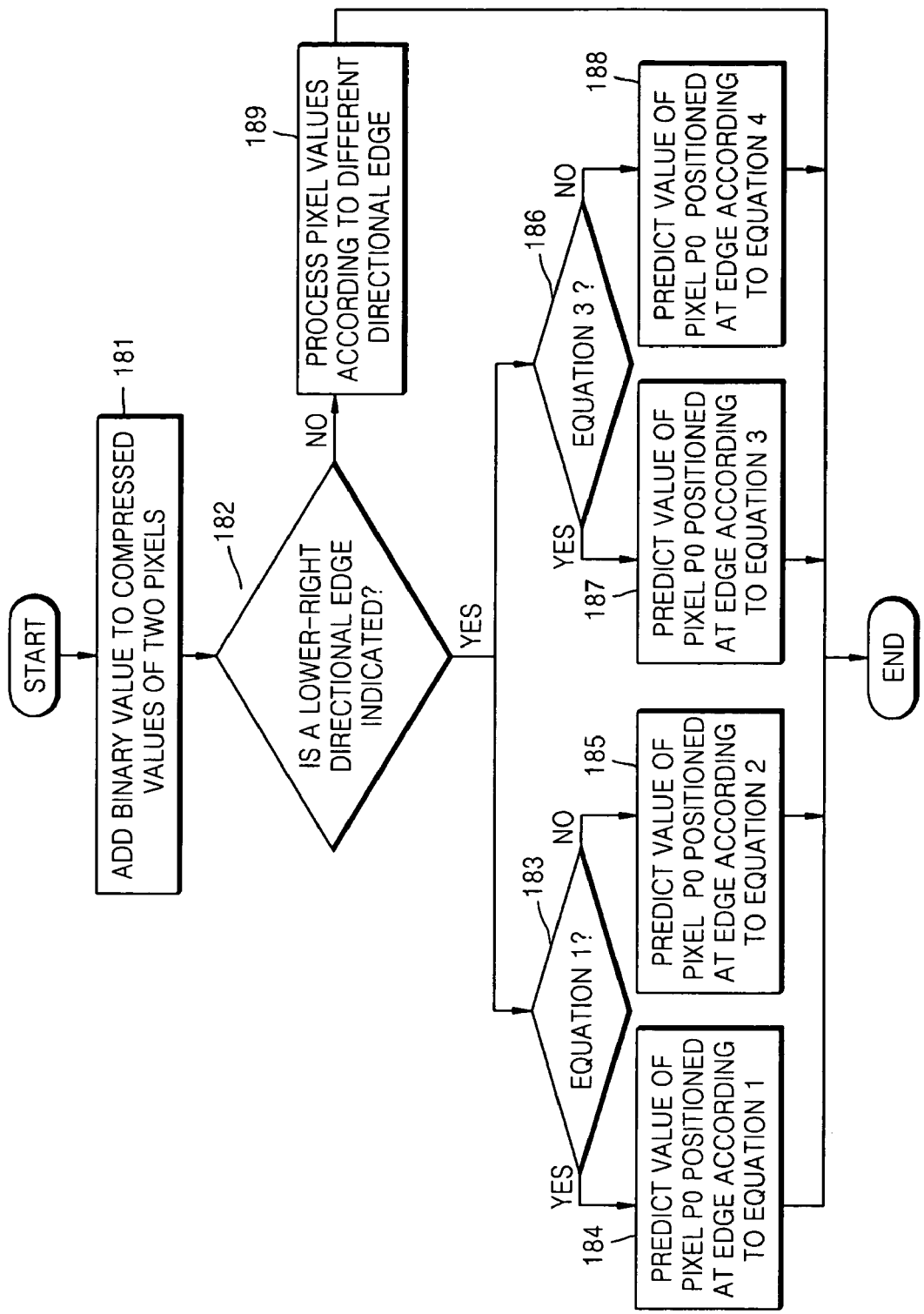
FIG. 18 illustrates an image restoring method such as that corresponding to operation 174 illustrated in FIG. 17.

FIG. 18 illustrates an image restoring method such corresponding to operation 174 illustrated in FIG. 17.

Referring to FIG. 18, the image restoring method corresponding to operation 174 illustrated in FIG. 17 may include operations that are sequentially processed by the second restoring unit 114 illustrated in operation 17. Accordingly, the above descriptions related to the second restoring unit 114 will also be applied to the image restoring method.

In operation 181, the second restoring unit 114 may extract compressed values A and B of two pixels among four pixels constructing a current block, from compressed data extracted by the bit parser 111 (see FIG. 11), for each color component of the current image.

In operation 181, the second restoring unit 114 may add a predetermined binary value to the compressed values A and B of the two pixels extracted in operation 181, thereby restoring values of the two pixels of the four pixels constructing the current block.

In operation 182, if an edge mode recognized by the mode recognition unit 112 indicates a lower-right directional edge, the second restoring unit 114 proceeds to operation 183, and if the edge mode indicates a different directional edge, the second restoring unit 114 proceeds to operation 189.

In operation 183, the second restoring unit 114 proceeds to operation 184 if a neighbor mode recognized by the mode recognition unit 112 represents neighboring pixels according to the pattern of Equation 1 with respect to a current pixel P0, which is the upper pixel of two pixels P0 and P3 (see FIG. 6), and proceeds to operation 185 if the neighbor mode represents neighboring pixels according to the pattern of Equation 2.

In operation 184, referring to FIG. 6, the second restoring unit 114 may predict a value of a current pixel P0, which is the upper pixel of two pixels P0 and P3 positioned at a lower-right directional edge, using an average value of values of the pixels P1, N1, P2, and N3 to the left and right of, and below and above, the current pixel P0, each of which are neighboring pixels of the current pixel P0, according to Equation 1, for each color component of the current image.

In operation 185, the second restoring unit 114 may predict a value of the current pixel P0, which is the upper pixel of the two pixels P0 and P3 positioned at the lower-right directional edge, by summing a value of the pixel N2 to the upper left of the current pixel P0 and a gradient value of the pixel P3 to the lower-right of the current pixel P0 with respect to the current pixel P0, according to Equation 2, for each color component of the current image.

In operation 186, the second restoring unit 114 proceeds to operation 187 if the neighbor mode recognized by the mode recognition unit 112, with respect to a current pixel P3, which is the lower of the two pixels P0 and P3, represents neighboring pixels according to the pattern of Equation 3, and proceeds to operation 188 if the neighbor mode with respect to the current pixel P3 represents neighboring pixels according to the pattern of Equation 4.

In operation 187, the second restoring unit 114 may predict a value of the current pixel P3, which is the lower of the two pixels P0 and P3 positioned at the lower-right directional edge, using an average value of values of the pixel P1 above the current pixel P3, the pixel P2 to the left of the current pixel P3, the left pixel N1 of the upper-left pixel P0 of the current pixel P3, and the pixel N3 above the upper-left pixel P0 of the current pixel P3, each of which are neighboring pixels of the current pixel P3, according to Equation 3, for each color component of the current image.

In operation 188, the second restoring unit 114 may predict a value of the current pixel P3, which is the lower of the two pixels P0 and P3 positioned at the lower-right directional edge, by obtaining an average value of values of the pixels P1 and P2 above and to the left of the current pixel P3, each of which are neighboring pixels of the current pixel P3, and summing the average value and a gradient value of the upper-left pixel P0 of the current pixel P3 with respect to the current pixel P3, according to Equation 4, for each color component of the current image.

In operation 189, the second restoring unit 114 may process different directional edges other than the lower-right directional edge, in the same way as the processing (as exemplified by operations 183 through 188) of the lower-right directional edge. Accordingly, more detailed description of the processing of the different directional edges will be omitted.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, by predicting values of pixels positioned at each directional edge among pixels constructing a 2×2 block in a current image, using values of neighboring pixels of the pixels, selecting an edge mode indicating a directional edge in which the difference between the predicted values and actual values of the pixels is a minimum, and outputting edge mode data indicating the edge mode instead of the predicted values corresponding to the edge mode, it is possible to effectively compress edge areas in which little similarity exists between pixel values and accordingly improve a compression rate of edge areas.

Also, according to one or more embodiments of the present invention, by recognizing an edge mode among a plurality of edge modes, and predicting values of pixels positioned at a directional edge corresponding to the recognized mode, among pixels constructing a block having a predetermined size in a current image, using values of neighboring pixels of the pixels, it is possible to effectively restore edge areas, and accordingly improve the picture quality of restored edge areas.

Furthermore, according to one or more embodiments of the present invention, by compressing values of pixels constructing a 2×2 block in a current image according to a variety of image compression methods, selecting a mode indicating one of the variety of image compression methods, and generating a bit stream packet including compressed data corresponding to the mode, it is possible to effectively compress a variety of images as well as edge areas. Also, according to the present invention, by extracting mode data and compressed data of a 2×2 block in a current image from a bit stream packet, recognizing a mode representing one of a plurality of image compression methods from the mode data, and restoring pixel values using the compressed data according to an image compression method indicated by the recognized mode, it is possible to effectively restore a variety of images as well as edge areas.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A pixel value prediction method comprising:
   (a) determining pixels positioned at a predetermined directional edge, among pixels constructing a block having a predetermined size in a current image;
   (b) determining neighbor pixels positioned in each of two areas divided by the predetermined directional edge; and
   (c) predicting values of the pixels positioned at the predetermined directional edge, using values of the determined neighbor pixels.

2. The pixel value prediction method of claim 1, wherein the neighbor pixels are at least two pixels, among the pixels constructing the block and pixels constructing a neighbor block of the block.

3. The pixel value prediction method of claim 1, wherein operation (b) comprises determining neighbor pixels positioned in one area of the two areas divided by the predetermined directional edge and neighbor pixels positioned in the other area of the two areas.

4. The pixel value prediction method of claim 2, wherein operation (a) comprises predicting values of the plurality of pixels positioned at the predetermined directional edge, using an average value of values of neighbor pixels positioned in one area of the two areas divided by the predetermined directional edge and of values of neighbor pixels positioned in the other area of the two areas.

5. An image compression method comprising:
   (a) predicting values of pixels positioned at a predetermined directional edge among pixels constructing a block having a predetermined size in a current image, using values of neighbor pixels of the pixels positioned at the predetermined directional edge;
   (b) repeating operation (a) with respect to each remaining directional edge except for the predetermined directional edge, among a plurality of directional edges;
   (c) selecting an edge mode in which the difference between the values predicted in operations (a) and (b) and actual values of the pixels positioned at the predetermined directional edge is a minimum;
   (d) outputting edge mode data indicating the selected edge mode, instead of the predicted values corresponding to the selected edge mode, thereby compressing the values of the pixels positioned at the predetermined directional edge.

6. The image compression method of claim 5, wherein operation (a) comprises predicting a value of a current pixel which is the upper pixel of two pixels positioned at a lower-right directional edge, using an average value of values of pixels to the right and left of and above and below the current pixel, which corresponds to neighbor pixels of the current pixel.

7. The image compression method of claim 6, wherein operation (a) comprises predicting the value of the current pixel which is the upper pixel of the two pixels positioned at the lower-right directional edge, by summing a value of a upper-left pixel of the current pixel and a value gradient from the current pixel to a lower-right pixel of the current pixel.

8. The image compression method of claim 7, wherein operation (a) further comprises selecting a neighbor mode corresponding to neighbor pixels used to obtain a predicted value of the current pixel having a smaller difference from the actual value of the current pixel among predicted values of the current pixel, from among two neighbor modes in which two patterns of neighbor pixels are respectively applied.

9. An image compression method comprising:
   (a) compressing values of pixels constructing a block having a predetermined size in a current image, according to a plurality of predetermined image compression methods;
   (b) predicting values of pixels positioned at a predetermined directional edge, among the pixels constructing the block, using values of neighbor pixels of the pixels positioned at the predetermined directional edge, thereby compressing the values of the pixels positioned at the predetermined directional edge;
   (c) selecting a mode from among a plurality of modes corresponding to the plurality of predetermined image compression methods and an image compression method used in operation (b), on the basis of the results compressed in operations (a) and (b); and
   (d) generating a bit stream packet including mode data indicating the selected mode and compressed data corresponding to the selected mode.

10. The image compression method of claim 9, further comprising restoring the values of the pixels constructing the block, using the results compressed in operations (a) and (b), wherein operation (c) comprises calculating differences between values of the restored pixels and actual values of the pixels constructing the block, and selecting a mode indicating an image compression method in which a sum of the differences is a minimum.

11. An image restoring method comprising:
   (a) recognizing an edge mode among a plurality of edge modes; and
   (b) predicting values of pixels positioned at a predetermined directional edge corresponding to the recognized edge mode, among pixels constructing a block having a predetermined size in a current image, using values of neighbor pixels of the pixels positioned at the predetermined directional edge.

12. The image restoring method of claim 11, wherein the neighbor pixels are at least two pixels, among the pixels constructing the block and pixels constructing a neighbor block of the block.

13. The image restoring method of claim 11, wherein operation (a) comprises predicting values of the plurality of pixels positioned at the predetermined directional edge, using values of a plurality of neighbor pixels positioned in each of two areas divided by the predetermined directional edge.

14. The image restoring method of claim 11, further comprising extracting a compressed value of predetermined pixels of the pixels constructing the block, from compressed data of the block, and adding a predetermined binary value to the compressed value of the predetermined pixel, thereby restoring a value of the predetermined pixel, wherein the neighbor pixels comprise the restored value of the predetermined pixel.

15. An image restoring method comprising:
  (a) extracting mode data and compressed data of a block having a predetermined size in a current image, from a bit stream packet;
  (b) recognizing a mode corresponding to an image compression method of a plurality of image compression methods, from the mode data; and
  (c) predicting values of pixels positioned at a directional edge indicated by the recognized mode, among pixels constructing the block, using values of neighbor pixels of the pixels positioned at the directional edge, according to the recognized mode, thereby restoring the values of the pixels positioned at the directional edge.

16. The image restoring method of claim 15, further comprising restoring the values of the pixels positioned at the directional edge, using the compressed data of the block, if the recognized mode corresponds to an image compression method of a plurality of predetermined image compression methods, wherein operation (c) comprises restoring the values of the pixels positioned at the directional edge using a different image compression method if the recognized mode corresponds to the different image compression method except for the predetermined image compression methods.

* * * * *